(12) United States Patent
Barga et al.

(10) Patent No.: US 8,315,990 B2
(45) Date of Patent: Nov. 20, 2012

(54) CONSISTENCY SENSITIVE STREAMING OPERATORS

(75) Inventors: Roger S Barga, Bellevue, WA (US); Jonathan D Goldstein, Kirkland, WA (US); Mohamed Ali, Bellevue, WA (US); Mingsheng Hong, Ithaca, NY (US)

(73) Assignee: Microsoft Corporation, Redmond, WA (US)

( * ) Notice: Subject to any disclaimer, the term of this patent is extended or adjusted under 35 U.S.C. 154(b) by 524 days.

(21) Appl. No.: 11/937,118

(22) Filed: Nov. 8, 2007

(65) Prior Publication Data
US 2009/0125635 A1   May 14, 2009

(51) Int. Cl.
*G06F 17/30* (2006.01)
(52) U.S. Cl. ......................................... 707/690; 707/756
(58) Field of Classification Search .................. 707/699, 707/690, 765, 691, 756; 709/232; 370/380; 712/239, 240
See application file for complete search history.

(56) References Cited

U.S. PATENT DOCUMENTS

| | | | |
|---|---|---|---|
| 5,321,837 A | 6/1994 | Daniel et al. | |
| 5,528,516 A | 6/1996 | Yemini et al. | |
| 5,546,570 A | 8/1996 | McPherson et al. | |
| 5,691,917 A | 11/1997 | Harrison | |
| 5,765,037 A * | 6/1998 | Morrison et al. | 713/502 |
| 5,809,235 A | 9/1998 | Sharma et al. | |
| 6,145,009 A | 11/2000 | Miyazawa et al. | |
| 6,236,998 B1 | 5/2001 | Lehtinen | |
| 6,253,313 B1 * | 6/2001 | Morrison et al. | 712/226 |
| 6,327,587 B1 | 12/2001 | Forster | |
| 6,449,618 B1 | 9/2002 | Blott et al. | |
| 6,601,058 B2 | 7/2003 | Forster et al. | |
| 6,604,102 B2 | 8/2003 | Klein et al. | |
| 6,629,106 B1 | 9/2003 | Narayanaswamy et al. | |
| 6,681,230 B1 | 1/2004 | Blott et al. | |
| 6,920,468 B1 * | 7/2005 | Cousins et al. | 1/1 |
| 6,925,631 B2 | 8/2005 | Golden | |
| 7,065,561 B2 | 6/2006 | Fry et al. | |
| 7,310,638 B1 | 12/2007 | Blair | |
| 7,349,675 B2 | 3/2008 | Karr et al. | |
| 7,349,925 B2 | 3/2008 | Cherkauer et al. | |
| 7,457,728 B2 | 11/2008 | Chen et al. | |
| 7,523,190 B1 | 4/2009 | Bickerstaff et al. | |
| 7,702,689 B2 | 4/2010 | Forstmann et al. | |
| 7,840,592 B2 | 11/2010 | Muras | |
| 2002/0083049 A1 | 6/2002 | Forster et al. | |
| 2003/0163465 A1 | 8/2003 | Morrill | |

(Continued)

FOREIGN PATENT DOCUMENTS
WO   2007035452 A1   3/2007

OTHER PUBLICATIONS

Eugene Wu, High-Performance Complex Event Processing over Streams, Jun. 2006, pp. 407-418.*

(Continued)

*Primary Examiner* — Sherief Badawi

(57) ABSTRACT

A new approach for handling stream imperfections based on speculative execution involves the retraction of incorrect events facilitated using operators to remove speculatively produced incorrect output. Additionally, parameters are disclosed that define a spectrum of consistency levels. A first parameter, maximum blocking time, exposes a tradeoff between a degree of speculation and latency. A second parameter, the maximum time data is remembered before being purged from the system, exposes a tradeoff between state size and correctness. Varying these two parameters produces a spectrum of consistency levels (e.g., strong, middle, weak) which address the specific tradeoffs built into other systems. Retraction is accomplished using operators that include Select, AlterLifetime, Join, Sum, Align, and Finalize.

18 Claims, 10 Drawing Sheets

U.S. PATENT DOCUMENTS

| | | | |
|---|---|---|---|
| 2004/0068428 | A1 | 4/2004 | Mitchell |
| 2004/0111396 | A1 | 6/2004 | Musayev et al. |
| 2004/0172599 | A1 | 9/2004 | Calahan |
| 2004/0205082 | A1 | 10/2004 | Fontoura et al. |
| 2005/0055631 | A1 | 3/2005 | Scardina et al. |
| 2005/0138081 | A1 | 6/2005 | Alshab et al. |
| 2005/0165724 | A1 | 7/2005 | West |
| 2005/0182758 | A1 | 8/2005 | Seitz et al. |
| 2006/0069942 | A1 | 3/2006 | Brasilerio et al. |
| 2006/0074741 | A1 | 4/2006 | Orumchian et al. |
| 2006/0100969 | A1 | 5/2006 | Wang et al. |
| 2006/0123119 | A1 | 6/2006 | Hill et al. |
| 2006/0136448 | A1 | 6/2006 | Cialini et al. |
| 2006/0149849 | A1 | 7/2006 | Raz |
| 2006/0161528 | A1 | 7/2006 | Dettinger et al. |
| 2006/0230071 | A1 | 10/2006 | Kass et al. |
| 2006/0248182 | A1 | 11/2006 | Glassco et al. |
| 2006/0282695 | A1* | 12/2006 | Mital et al. .................. 713/502 |
| 2007/0043856 | A1 | 2/2007 | Morris et al. |
| 2007/0118545 | A1 | 5/2007 | Chandrasekharan et al. |
| 2007/0136239 | A1 | 6/2007 | Lee et al. |
| 2007/0168990 | A1 | 7/2007 | Alshab et al. |
| 2007/0237410 | A1 | 10/2007 | Cormode et al. |
| 2007/0255529 | A1 | 11/2007 | Biazetti et al. |
| 2007/0294217 | A1 | 12/2007 | Chen et al. |
| 2008/0016095 | A1 | 1/2008 | Bhatnagar et al. |
| 2008/0065666 | A1 | 3/2008 | Rose et al. |
| 2008/0134158 | A1 | 6/2008 | Salz et al. |
| 2008/0256384 | A1 | 10/2008 | Branson et al. |
| 2008/0301135 | A1 | 12/2008 | Alves et al. |
| 2009/0052341 | A1 | 2/2009 | Enqvist |
| 2009/0070765 | A1 | 3/2009 | Alves et al. |
| 2009/0100029 | A1 | 4/2009 | Jain et al. |
| 2009/0106190 | A1 | 4/2009 | Srinivasan et al. |
| 2009/0106218 | A1 | 4/2009 | Srinivasan et al. |
| 2009/0125550 | A1 | 5/2009 | Barga et al. |
| 2009/0125635 | A1 | 5/2009 | Barga et al. |
| 2009/0204551 | A1 | 8/2009 | Wang et al. |
| 2009/0228465 | A1 | 9/2009 | Krishnamurthy et al. |
| 2009/0319501 | A1 | 12/2009 | Goldstein et al. |
| 2010/0017214 | A1 | 1/2010 | Ambrosio et al. |
| 2010/0017379 | A1 | 1/2010 | Naibo et al. |
| 2010/0041391 | A1 | 2/2010 | Spivey et al. |
| 2010/0088325 | A1 | 4/2010 | Goldstein et al. |
| 2010/0121744 | A1 | 5/2010 | Belz et al. |
| 2010/0131538 | A1 | 5/2010 | Jones et al. |
| 2010/0280857 | A1 | 11/2010 | Liu et al. |
| 2010/0331146 | A1 | 12/2010 | Kil |
| 2011/0040808 | A1 | 2/2011 | Joy et al. |
| 2011/0093866 | A1 | 4/2011 | Grabs et al. |
| 2012/0084322 | A1 | 4/2012 | Goldstein et al. |

OTHER PUBLICATIONS

Eugene et al, High-Performance Complex Event Processing over Streams,Jun. 2006, 407-418.*

Barish et al., Speculative Execution for Information Gathering Plans, 2002, pp. 184-193.*

Preiss et al., On the Trade-off between Time and Space in Optimistic Parallel Discrete-Event Simulation, 1992, pp. 1-10.*

Michael David Smith, Support for Speculative Execution in High-Performance Processors, 1992, pp. 7-89.*

Barish et al., Speculative Plan Execution for Information Gathering, 2008, pp. 1-50.*

Barga, et al., "Coping with Variable Latency and Disorder in Distributed Event Streams", 26th IEEE International Conference on Distributed Computing Systems Workshops (ICDCSW'06), 2006, pp. 6.

Pallickara, "A Grid Event Service ", Graduate School of Syracuse University, Jun. 2001, pp. 110.

"Jiang, et al", "Estreams: Towards an Integrated Model for Event and Stream Processing", retrieved at <<http://ariana.uta.edu/research/Publications/Downloads/CSE-2004-3.pdf>>, Jul. 1, 2004. pp. 25.

"Complex Event Processing Made Simple Using Esper ", retrieved at <<http://www.theserverside.com/tt/articles/article.tss?l=ComplexEventProcessing>>, Apr. 2008. pp. 5.

Bry et al, "A High-Level Query Language for Events", retrieved at <<http://www.pms.ifi.lmu.de/mitarbeiter/eckert/publications/EDA-PS2006.pdf>>, 2006. pp. 8.

Wei et al, "ReCEPtor: Sensing Complex Events in Data Streams for Service-Oriented Architectures", retrieved at <<http://www.hpl.hp.com/techreports/2007/HPL-2007-176.pdf>>, Nov. 2, 2007. pp. 22.

"Oracle CEP 11gR1—official support for CQL", retrieved at <<http://adcalves.wordpress.com/2009/07/01/oracle-cep-11gr1-official-support-for-cq1/>>, Jul. 1, 2009. pp. 3.

Barga et al, "Consistent Streaming Through Time: A Vision for Event Stream Processing", retrieved at <<http://www.cs.cornell.edu/~mshong/papers/cidr%2007%20cedr.pdf>>, Jan. 7-10, 2007. pp. 12.

"Explicit Server Development Model", retrieved at <<http://msdn.microsoft.com/en-us/library/ee391319(SQL.105).aspx>>, 2009, pp. 3.

"SQL Server 2008 R2—StreamInsight Technology", retrieved at <<http://www.microsoft.com/sqlserver/2008/en/us/R2-complex-event.aspx>>, 2009, pp. 2.

"Microsoft StreamInsight", retrieved at <<http://msdn.microsoft.com/en-us/library/ee362541(SQL.105,printer).aspx>>, 2009, pp. 1.

Grabs et al, "Introducing Microsoft's Platform for Complex Event Processing", May 2009. pp. 24.

Grabs et al, "Introducing Microsoft StreamInsight", Sep. 2009. pp. 27.

Jiang et al, "Anatomy of a Data Stream Management System", retrieved at <<http://ftp.informatik.rwth-aachen.de/Publications/CEUR-WS/Vol-215/paper12.pdf>>, 2004. pp. 16.

"Complex Event Processing (CEP)", retrieved at <<http://www.progress.com/psm/apama/data-streams/index.ssp>>, Mar. 9, 2007. pp. 2.

"Event-Driven Models and Complex Event Processing", retrieved at <<http://www.cxo.eu.com/article/Event-driven-models-and-complex-event-processing/>>, 2009. pp. 3.

Snoeren et al, "Mesh-Based Content Routing using XML", retrieved at <<http://xml.coverpages.org/SnoerenMESH-XML.pdf>>, 2001. pp. 14.

Ravindran et al, "A Resource Management Model for Dynamic, Scalable, Dependable, Real-Time Systems", retrieved at <<http://citeseerx.ist.psu.edu/viewdoc/download?doi=10.1.1.40.5779&rep=rep1&type=ps>>, Apr. 11, 2006. pp. 6.

Johnson et al, "A Heartbeat Mechanism and its Application in Gigascope", retrieved at <<http://www.vldb.org/conf/2005/papers/p1079-johnson.pdf>>, 2005. pp. 10.

Oberoi et al, "Integrating DDS and COTS Complex-Event Processing Engines", retrieved at <<http://www.omg.org/news/meetings/workshops/RT-2007/04-5_0beroi_etal-revised.pdf>>, Jul. 2007. pp. 42.

Srivastava et al, "Flexible Time Management in Data Stream Systems", retrieved at <<http://infolab.stanford.edu/~usriv/papers/time.pdf>>, PODS 2004 Jun. 14-16, 2004, Paris, France. pp. 11.

Raizman, et al., "An Extensible Test Framework for the Microsoft StreamInsight Query Processor", Retrieved at <<http://research.microsoft.com/pubs/132100/Testing%20StreamInsight.pdf>>, Proceedings of the Third International Workshop on Testing Database Systems, Jun. 7, 2010, pp. 6.

"Event Stream Intelligence with Esper and NEsper", Retrieved at <<http://esper.codehaus.org/>>, Retrieved Date: Mar. 7, 2011, pp. 4.

"Complex Event Processing Tutorial", retrieved at <<http://www.eventstreamprocessing.com/CEP-tutorial.htm>>, Jun. 2007, pp. 1-2.

Gyllstrom, et al., "SASE: Complex Event Processing over Streams", 3rd Biennial Conference on Innovative Data Systems Research (CIDR), Jan. 2007, pp. 407-411.

Loddengaard, Alex, "FoneDoktor, A WibiData Application", Retrieved on: Jan. 18, 2012, Available at: http://www.cloudera.com/blog/2011/12/fonedoktor-a-wibidata-application/.

Babcock, et al.; "Models and Issues in Data Stream Systems"; Proceedings of the 21st ACM SIGMOD-SIGACT-SIGART Symposium on Principles of Database Systems (PODS '02); 2002; pp. 1-30.

Babu, et al. "StreaMon: An Adaptive Engine for Stream Query Processing"; ACM International Conference on Management of Data (SIGMOD 2004); 2004; pp. 931-932.

Chen, et al. "NiagaraCQ: a Scalable Continuous Query System for Internet Databases"; Proceedings of the 2000 ACM SIGMOD International Conference on Management of Data; 2000; pp. 379-390.

Cherniack, et al.; "Scalable Distributed Stream Processing"; Proceedings of the 2003 CIDR Conference; 2003; pp. 1-12.

Goldstein, J. et al.; "Flying Fixed-Point: Recursive Processing in Stream Queries"; VLDB '08; Aug. 24-30, 2008; Auckland, New Zealand.

Srivastava, et al.; "Operator Placement for In-Network Stream Query Processing"; Technical Report; 2004; pp. 10.

Nano, et al., US Patent Application entitled, "Local Event Processing", U.S. Appl. No. 13/189,566, filed Jul. 25, 2011, and assigned to Microsoft Corporation, 41 pages.

Akchurin et al., US Patent Application entitled, "Managing Distributed Analytics on Device Groups", U.S. Appl. No. 13/438,836, filed Apr. 3, 2012, and assigned to Microsoft Corporation, 36 pages.

\* cited by examiner

CONSISTENCY SENSITIVE STREAMING OPERATORS

CROSS-REFERENCE TO RELATED APPLICATIONS

This application is related to pending U.S. patent application Ser. No. 11/937,011 entitled "TEMPORAL EVENT STREAM MODEL" and filed Nov. 8,2007.

BACKGROUND

Many new requirements for streaming and event processing systems have been developed and used to design stream/event processing systems. These requirements derive from a multitude of motivating scenarios, some of which include sensor networks, large scale system administration, internet scale monitoring, and stock ticker data handling. Events from these streaming applications are frequently sent across unreliable networks resulting in the events frequently arriving at the associated stream processing system out-of-order.

Due to radically different performance and correctness requirements across different problem domains, systems have been vertically developed to handle a specific set of tradeoffs. These requirements include continuous queries (e.g., computing a one minute moving average for heat across a sensor network), insert/event rates that are very high (e.g., orders of magnitude higher than a traditional database can process inserts), and query capabilities for handling increasingly expressive standing queries (e.g., stateful computation such as join).

While streaming systems exist for specific vertical markets, broad adoption of a single system across a wide spectrum of application domains remains unattained. This is due in part to a need for domain-specific correct handling of out-of-order data and data retraction.

This requirement is exemplified by the following three scenarios. A corporate network of machines produces system maintenance events. As a result of transient network phenomena, such as network partitioning, individual events can get arbitrarily delayed. Since the consequence of an alert (e.g., finding machines that did not boot-up after a patch was installed) can require human intervention, problem install reporting should be delayed until the events get to the stream processing system. Another scenario involves the collecting of statistics on web traffic. Since networks are unreliable and there is far too much data to remember for any significant period of time, systems simply process the data as it comes in, dropping significantly late arriving data and reporting the best answer that can reasonably computed.

A final scenario involves the monitoring of stock activity for the purpose of computing trades. When the stock feed provides incorrect data there is service level agreement in place which gives the data provider a predetermined period of time (e.g., 72 hours) to report the correct ticker price for each reading. If a stock trade occurs using an incorrect price, the parties have the option to back out of the transaction during that period. Consequently, even though results are provided immediately, corrections may lead to some form of compensation. The system should respond instantly, but provide corrections when necessary.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The novel architecture is a new approach for handling stream imperfections based on speculative execution. Specifically, the retraction of incorrect events is facilitated using operators to remove speculatively produced incorrect output.

Additionally, parameters are disclosed that define a spectrum of consistency levels. A first parameter, maximum blocking time, exposes a tradeoff between a degree of speculation and latency. A second parameter, the maximum time data is remembered before being purged from the system, exposes a tradeoff between state size and correctness. Varying these two parameters produces a spectrum of consistency levels (e.g., strong, middle, weak) which address the specific tradeoffs built into other systems.

Retraction is accomplished using operators that include Select, AlterLifetime, Join, Sum, Align and Finalize. Additionally, algorithms are defined for the streaming operators that product speculative output. The algorithms fully implement the entire spectrum of consistency levels for a rich computational model based on relational algebra. Moreover, these algorithms are provably efficient, and are either optimal or within a logarithmic value of being optimal for the worst case scenarios. When state is bounded, as is typically the case for windowed queries over well-behaved streams, the algorithms are linear, optimal, and have state complexity of $O(1)$.

To the accomplishment of the foregoing and related ends, certain illustrative aspects are described herein in connection with the following description and the annexed drawings. These aspects are indicative, however, of but a few of the various ways in which the principles disclosed herein can be employed and is intended to include all such aspects and equivalents. Other advantages and novel features will become apparent from the following detailed description when considered in conjunction with the drawings.

DETAILED DESCRIPTION

Figure 1:
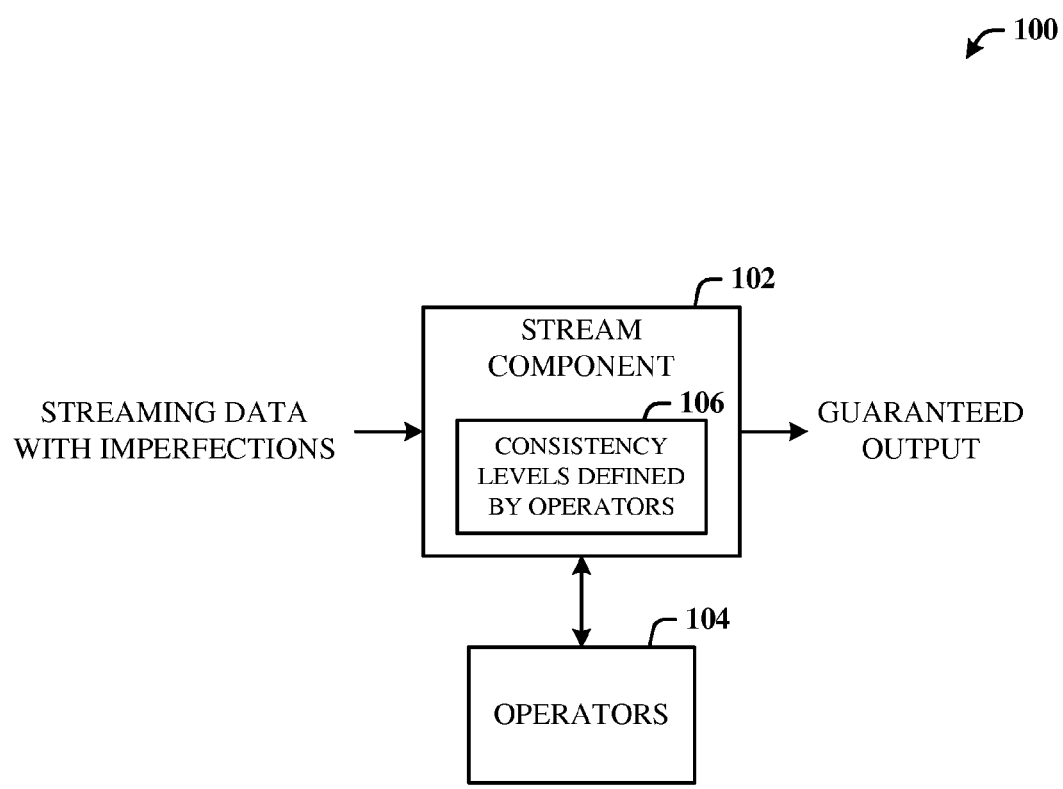
FIG. 1 illustrates a computer-implemented system for stream processing.

The disclosed architecture illustrates realization of a bitemporal model for streaming data systems. Operators (Select, Join, AlterLifetime, Align and Finalize) are employed to implement a full spectrum of consistency levels for operating a stream processer. Operator algorithms are also described that are provably efficient and close to optimal.

Conventional stream systems separate the notion of application time and system time, where application time is the clock that event providers use to timestamp tuples created by the providers, and system time is the clock of the receiving stream processor. The disclosed architecture, referred to throughout this description as the CEDR (complex event detection and response) system, further refines application time into occurrence time and valid time, thereby providing a tritemporal model of occurrence time, valid time, and system time.

A temporal stream model is used to characterize streams, engine operator semantics, and consistency levels for handling out-of-order or invalidated data. In one implementation, the tritemporal model is employed. The temporal model employed herein, however, is simplified in the sense of modeling valid time and system time (occurrence time is omitted). For the purposes of this description, this is sufficient, since only these two notions of time are necessary to understand the disclosed speculative output and consistency levels.

A CEDR data stream is modeled as a time varying relation. For most operators, an interpretation is used that a data stream models a series of updates on the history of a table, in contrast to conventional work which models the physical table updates themselves. In CEDR, a stream is modeled as an append-only relation. Each tuple in the relation is an event, and has a logical ID and a payload. Each tuple also has a validity interval, which indicates the range of time when the payload is in the underlying table. Similar to the convention in temporal databases, the interval is closed at the beginning, and open at the end. Valid start and end times are denoted as $V_s$ and $V_e$, respectively. When an event arrives at a CEDR stream processing system, its CEDR (or system) time, denoted as C, is assigned by the system clock. Since, in general, CEDR systems use different clocks from event providers, valid time and CEDR time are not assumed to be comparable.

CEDR has the ability to introduce the history of new payloads with insert events. Since these insert events model the history of the associated payload, both valid start and valid end times are provided. In addition, CEDR streams can also shrink the lifetime of payloads using retraction events. These retractions can reduce the associated valid end times, but are not permitted to change the associated valid start times. Retraction events provide new valid end times, and are uniquely associated with the payloads whose lifetimes are being reduced. A full retraction is a retraction where the new valid end time is equal to the valid start time.

The history of a stream can be represented in a history table such as the one shown in Table 1.

TABLE 1

Example of a History Table.

| ID | $V_s$ | $V_e$ | C | (Payload) |
|----|----|----|---|-----------|
| E0 | 1 | ∞ | 1 | P1 |
| E0 | 1 | 10 | 2 | P1 |
| E0 | 1 | 5 | 3 | P1 |
| E1 | 4 | 9 | 3 | P2 |

There are two events in this table. The first event, E0, has a lifetime initially established at CEDR time 1 with payload P1, valid start time of 1, and valid end time of infinity. At CEDR times 2 and 3, the valid end time is retracted first to 10, then to 5. The second event, E1, is initially modeled at CEDR time 3 and has a payload of P2, a valid start time of 4, and a valid end time of 9.

A canonical history table is a history table in which all retracted rows are removed, all rows whose event IDs are fully retracted are removed, and the C column is projected out. In cases with multiple retractions for the same ID, the order is unambiguous, since $V_e$ can only shrink. For instance, in Table 1, both the first and second rows of the table are removed since these rows are both retracted. Canonical history tables reflect the eventual history of the stream, independent of CEDR arrival time, after retractions have been taken into account.

An infinite history table contains all events over all time. Two streams are logically equivalent if the streams have identical infinite canonical history tables.

Following is a definition of a first notion of operator correctness, which applies to all computational operators (as opposed to operators whose purpose is to vary consistency):

Definition 1: A CEDR operator O is well-behaved iff for all (combinations of) inputs to O which are logically equivalent, O's outputs are also logically equivalent.

Intuitively, Definition 1 indicates that a CEDR operator is well-behaved as long as the output produced by the operator semantically converges to the output produced by a perfect version of the input without retractions and out-of-order delivery.

A second notion of operator correctness only applies to operators which are based on materialized view update semantics.

Definition 2: Assuming the stream models the changes to a relation, and the valid time intervals as describing the time $(V_s)$ at which the payload was inserted, and the time $(V_e)$ at which the payload was removed, a view update compliant operator produces snapshot identical output for snapshot identical input. In other words if the table contents are identical for all snapshots of two inputs, the output snapshots must also match.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof.

FIG. 1 illustrates a computer-implemented system 100 for stream processing. The system 100 includes a stream component 102 for receiving stream data that includes data imperfections based on speculative execution and for providing consistency in an output. The system 100 also includes a set of operators 104 for providing multiple consistency levels 106 via which consistency in the output is guaranteed. Correction of the output is based on retraction and is accomplished using operators that include Select, AlterLifetime, Join, Sum, Align, and Finalize.

Figure 2:
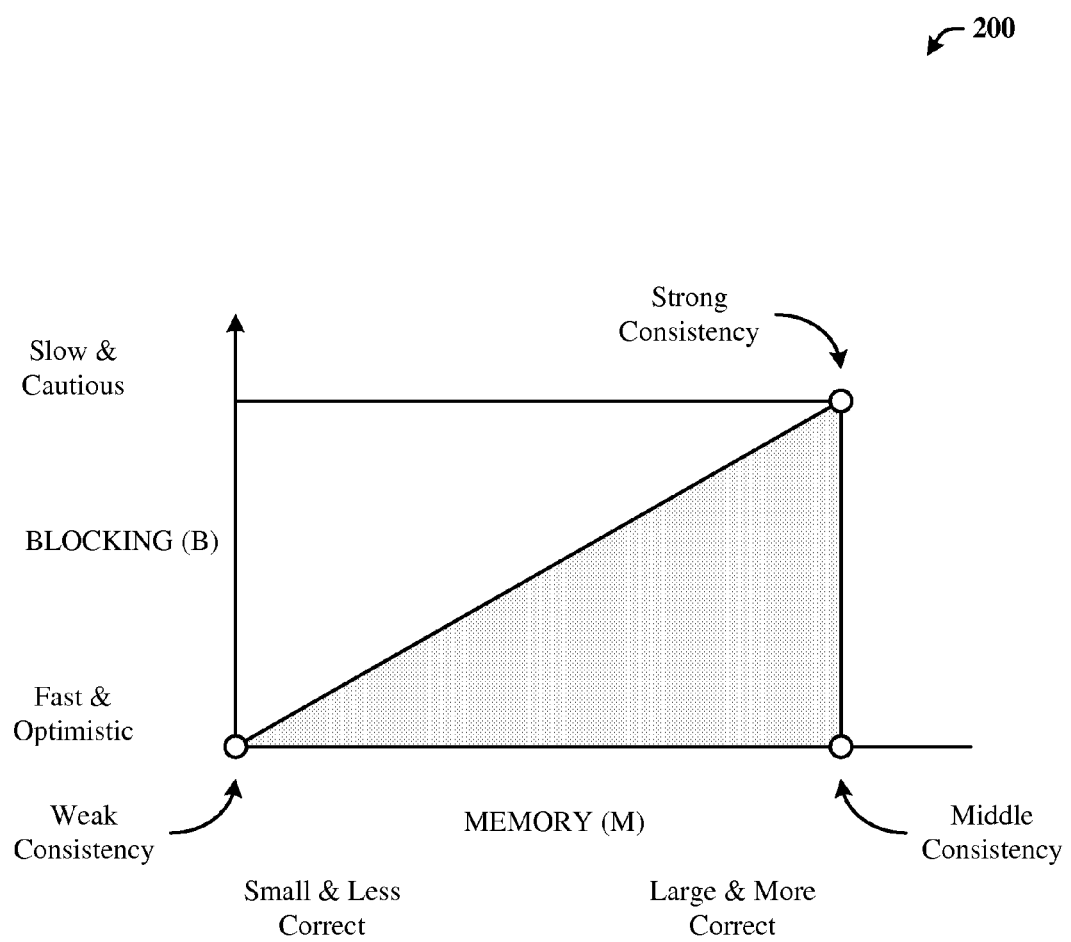
FIG. 2 illustrates a graph of the consistency levels of FIG. 1.

FIG. 2 illustrates a graph 200 of the consistency levels 106 of FIG. 1. Two aspects of query processing can be varied: how long to wait before providing and answer (blocking), and how long to remember input state for both blocking and providing necessary compensations once unblocked. These two variables lead to the graph 200 of consistency levels, which include strong consistency, middle consistency, and weak consistency.

Blocking time is a measure on the vertical axis and the data retention time in memory on the horizontal axis. The consistency levels are as follows: weak consistency is obtained at the origin where the blocking time and data retention are the shortest; middle consistency is obtained when the data retention is the longest but blocking time is the shortest; and, and strong consistency is obtained when the data retention is the longest and the blocking time is the longest.

Table 2 illustrates the qualitative implications of running CEDR at a specific consistency level. The table considers two cases per consistency level: a highly-ordered stream and an out-of-order stream, where orderliness is measured in terms of the frequency of the application declared sync point.

TABLE 2

Consistency tradeoffs

| Consistency | Orderliness | Blocking | State Size | Output Size |
|---|---|---|---|---|
| Strong | High | Low | Low | Minimal |
|  | Low | High | High | Minimal |
| Middle | High | None | Low | Low |
|  | Low | None | High | High |
| Weak | High | None | Low- | Low- |
|  | Low | None | Low- | Low- |

Table 2 shows that the middle and strong consistency levels have the same state size—the tradeoff here is between the blocking times (responsiveness) and the output size. This is caused by the contrasting way that the two levels handle out-of-order events. The strong level aligns tuples by blocking, possibly resulting in significant blocking and large state, if the input is significantly out-of-order. In contrast, the middle level optimistically generates output, which can be repaired later using retractions and insertions. Both the middle and the weak consistency levels are non-blocking—as distinguished by output correctness up to (versus at) arbitrary points of time. As a consequence, in the weak consistency level, there is no obligation to fix earlier state, and both the output size and state size are much improved over the middle level when events are highly out-of-order. When events are well ordered, the strong level of consistency can be enforced with marginal added cost over weak consistency.

Figure 3:
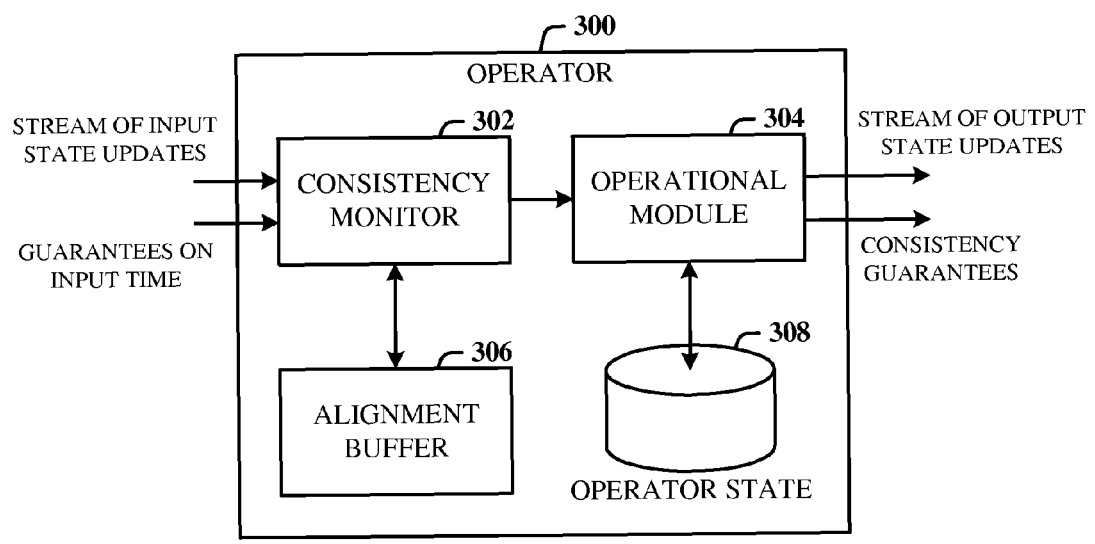
FIG. 3 illustrates an anatomy of an operator.

FIG. 3 illustrates an anatomy of an operator 300. In order to understand what these levels of consistency mean in a real system, the role and functionality of a CEDR (logical) operator are described in a high level fashion. The CEDR provides a set of composable operators that can be combined to form a pipelined query execution plan. Each CEDR operator 300 has two components: a consistency monitor 302 and an operational module 304. The consistency monitor 302 receives a stream of input state updates and decides whether to block the input stream in an alignment buffer 306 until output can be produced which upholds the desired level of consistency. The operational module 304 computes the output stream (stream of output state updates) based on incoming tuples and current operator state 308, and also outputs consistency guarantees.

Moreover, the CEDR operator 300 (via the consistency operator 302) accepts occurrence time guarantees on subsequent inputs (e.g., provider declared sync points on input streams). These guarantees are used to uphold the highest level of consistency, and allow the reduction of operator state in all levels of consistency. The CEDR operator 300 also annotates the output with a corresponding set of future output guarantees. These guarantees are fed to the next operator and streamed to the user with the query result.

A noteworthy property of CEDR operators is that the operators are based on view update semantics. These semantics are used to prove that at common sync points, the operators output the same bitemporal state regardless of consistency level. As a result, switching from one consistency level to another is seamless at these points, producing the same subsequent stream as if CEDR had been running at that consistency level all along.

Figure 4:
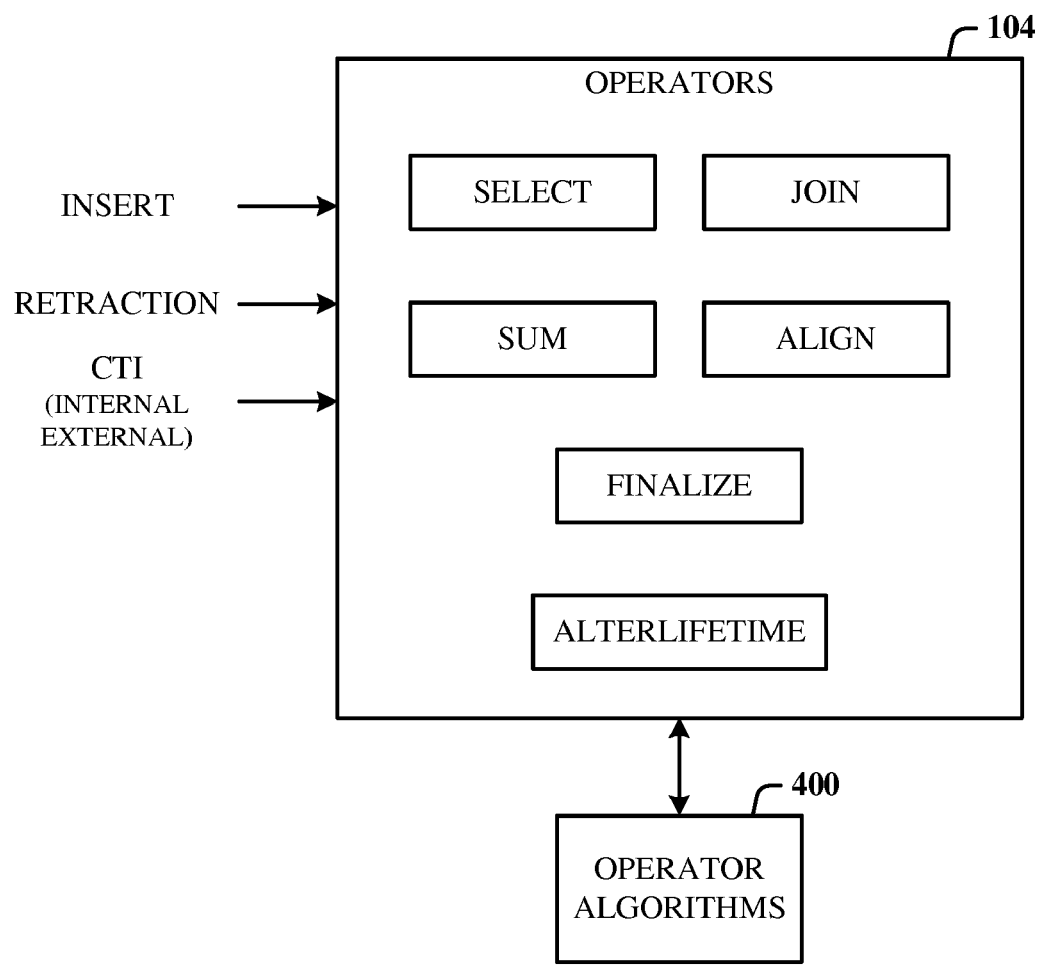
FIG. 4 illustrates operators and operator algorithms employed herein for multiple levels of consistency in a stream processor.

FIG. 4 illustrates operators 104 and operator algorithms 400 employed herein for multiple levels of consistency in a stream processor. The operators include Select, AlterLifetime, Join, Sum, Align, and Finalize. Algorithms 400 are provided for three view update compliant operators: a stateless operator (Select or Selection), a join-based operator (Equijoin), and an aggregation-based operator (Sum). In these definitions, E(S) is the set of events in the infinite canonical history table for stream S.

Selection corresponds exactly to relational selection and takes a Boolean function f which operates over the payload. The definition follows:

Definition 3: Selection $\sigma_f(S)$:

$$\sigma_f(S)=\{(e.V_s, e.V_e, e.\text{Payload})|e \in E(S) \text{ where } f(e.\text{Payload})\}$$

Similarly, the next operator is Join, which takes a Boolean function $\theta$ over two input payloads:

Definition 4: Join $\bowtie_{f(P1,P2)}(S_1, S_2)$:

$\bowtie_{\theta(P1,P2)}(S_1, S_2)=\{(V_s, V_e, (e_1.\text{Payload} \text{ concatenated with } e_2.\text{Payload}))|e_1 \in L(S_1), e_2 \in E(S_2), V_s=\max\{e_1.V_s, e_2.V_s\}, V_e=\min\{e_1.V_e, e_2.V_e\}, \text{ where } V_s<V_e, \text{ and } \theta(e_1.\text{Payload}, e_2.\text{Payload})\}$ Intuitively, the definition of Join semantically treats the input streams as changing relations, where the valid time intervals are the intervals during which the payloads are in the respective relations. The output of the Join describes the changing state of a view which joins the two input relations. In this sense, many operators follow view update semantics.

A materialized view compliant operator Sum is now introduced. The operator Sum adds the values of a given column for all rows in each snapshot, starting at the earliest possible time. The given definition is implementable without retractions if there are no retractions in the input, and all events arrive in $V_s$ order. More specifically, only sums associated with snapshots which precede the arriving event's $V_s$ are output. Note that the output event lifetimes have valid start and end points which are determined by the valid start and end points of the input events. This is sensible given that the output sum values may only change when an input tuple is added or removed from the modeled input relation. The definition for sum follows:

Definition 5: $\text{Sum}_A(S)$:

$$C=\{e.V_s|e \in S\} \cup \{e.V_e|e \in S\} \cup \{0\}$$

Let C[i] be the ith earliest element of C $$\text{sum}_A(S)=\{(V_s, V_e; a)\|C|>i>=1, V_s=C[t], V_e=C[t+1], a=\Sigma_{e \in S, e.Vs<=Vs, Ve<=e.Ve} e.A\}$$

While all CEDR computational operators are well-behaved, not all are view update compliant. Indeed, the streaming-only operators (e.g., windows, deletion removal) are not view update compliant by necessity. In CEDR, these operators can be modeled with AlterLifetime. AlterLifetime takes two input functions, $f_{Vs}(e)$ and $f_\Delta(e)$. Intuitively, AlterLifetime maps the events from one valid time domain to another valid time domain. In the new domain, the new $V_s$ times are computed from $f_{Vs}$, and the durations of the event lifetimes are computed from $f_\Delta$. The definition follows:

Definition 6: AlterLifetime $\Pi_{f_{Vs}, f_\Delta}(S)$ $$\Pi_{f_{Vs}, f_\Delta}(S)=\{((|f_{Vs}(e)|, |f_{Vs}(e)|+|f_\Delta(e)|, e.\text{Payload})|e \in E(S)\}$$

From a view update compliant operator perspective, Alter-Lifetime has the effect of reassigning the snapshots to which various payloads belong. AlterLifetime can therefore be used to reduce a query which crosses snapshot boundaries (e.g., computing a moving average of a sensor value) to a problem which computes results within individual snapshots, and is therefore, view update compliant. For instance, a moving window operator, denoted W, is a special instance of Π. This operator takes a window length parameter wl, and assigns the validity interval of its input based on wl. More precisely: $W_{wl}(S)=\Pi_{Vs,wl}(S)$. Once using AlterLifetime in this manner, each snapshot of the result contains all tuples which contribute to the windowed computation at that snapshot's point in time. Therefore, when this output is fed to Sum, the result is a moving sum with window length wl.

A similar definition for hopping windows using integer division can be obtained. Finally, the AlterLifetime operator can be used to easily obtain all inserts and deletes from a stream: $Inserts(S)=\Pi_{Vs,\infty}(S)$ and $Deletes(S)=\Pi_{Ve,\infty}(S)$.

Two additional operators, Align and Finalize, are employed to implement the full spectrum of consistency levels and are described below.

The operators respond to individual events as the events arrive at the CEDR system. While CEDR time is implicitly encoded in the event arrival order, system (or CEDR) time is not explicitly part of a CEDR physical event.

CEDR operators 104 receive, sequentially, three types of events. The first type of event is an insert, which corresponds semantically to insert events in the CEDR bitemporal model (valid time and system time, but not occurrence time). Insert events come with $V_s$ and $V_e$ timestamps, and also a payload. Note that the CEDR system uses bag semantics, and, therefore, can receive two inserts with identical payloads and identical life spans.

The second type of event is a retraction, which corresponds semantically to retractions in the CEDR bitemporal model. Since retractions are paired with corresponding inserts or previous retractions, pairing is established using global event IDs or by including in the retraction sufficient information to establish the pairing. If using global IDs, certain stateless operators (e.g., Select) become more complicated. Since retractions are far less common than inserts, all necessary information will be included in the retraction to establish the connection with the original insert. Note, however, that the algorithms presented described herein can be adapted to make use of global IDs, if desirable. CEDR physical retractions therefore include the original valid time interval, $V_s$ and $V_e$, the new end valid time $V_{newe}$, and the payload values from the original insert.

The physical stream associated with the logical stream in Table 1 is given in Table 3 below:

TABLE 3

Physical Stream Representation

| Event Type | $V_s$ | $V_e$ | $V_{Newe}$ | (Payload) |
|---|---|---|---|---|
| Insert | 1 | ∞ | | P1 |
| Retract | 1 | ∞ | 10 | P1 |
| Retract | 1 | 10 | 5 | P1 |
| Insert | 4 | 9 | | P2 |

The third type of event, called a CTI (current time increment), is a kind of punctuation. CTI comes with a timestamp $V_e$. The semantics of the message are that all events have arrived in the stream where the event synchronization (sync) times are less than the accompanying timestamp. More specifically, the sync times for insert events occur at $V_s$, while the sync times for retraction events occur at $V_{newe}$.

There are two types of CTIs. The first type is an internal CTI, which cannot be reordered to a position in the stream prior to its earliest correct placement. This corresponds to the CTI described in the earlier paragraph. The second type of CTI, called an ExternalCTI, can arrive arbitrarily out-of-order relative to the rest of the stream contents. As described herein, Finalize is defined only to the handling of External-CTIs, which converts out-of-order external CTIs into ordered internal CTIs. External CTIs have a $V_s$, a $V_e$, and a Count. The semantics are that Count events exist in the stream whose sync times are in the timestamp interval $[V_s,V_e)$. Furthermore, while ExternalCTIs may arrive arbitrarily out-of-order, ExternalCTIs have non-overlapping valid time intervals.

Figure 5:
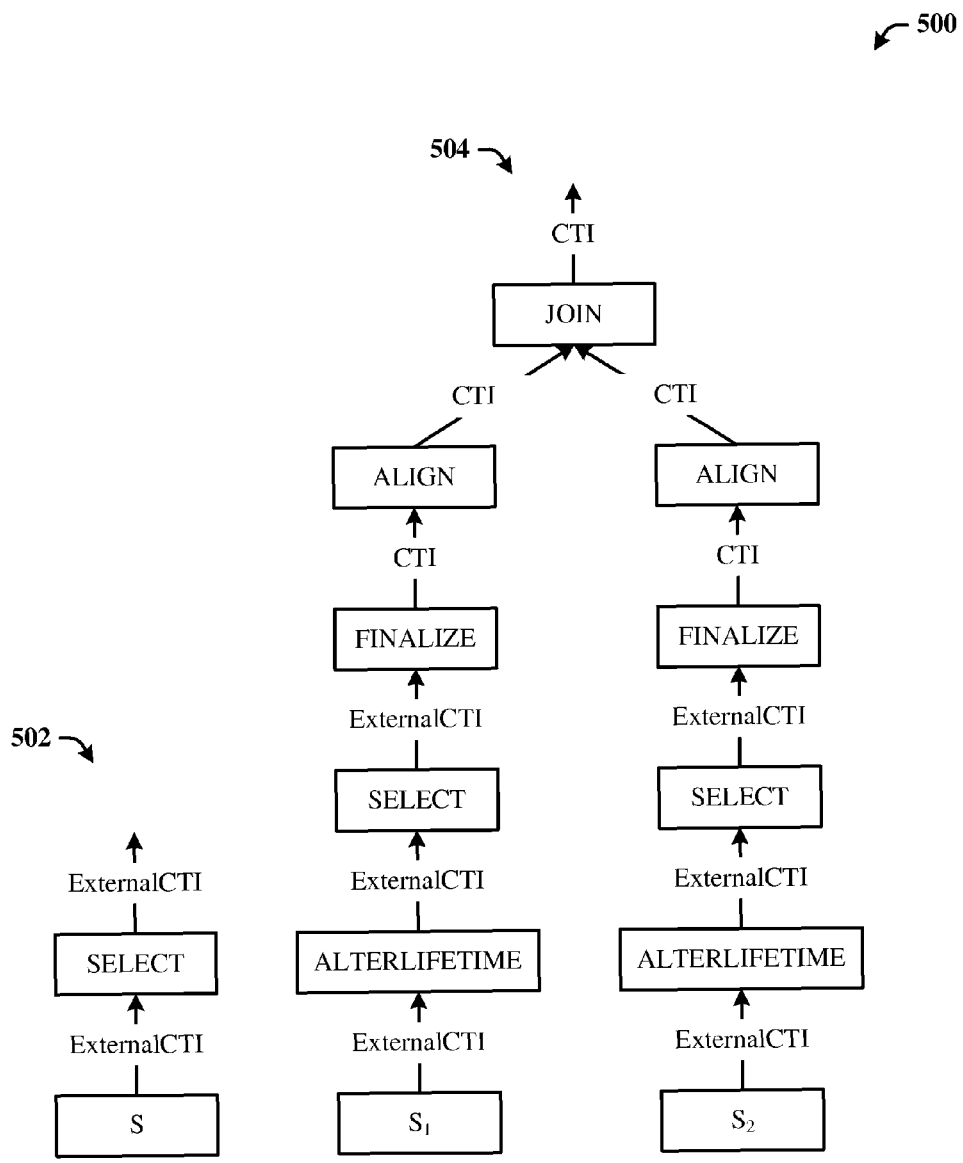
FIG. 5 illustrates exemplary CEDR query plans.

FIG. 5 illustrates exemplary CEDR query plans 500. Note that in these plans, Finalize has two purposes. First, Finalize forces the purging of state in a stateful operator by issuing CTIs, and therefore, controls the forgetfulness axis (Memory) of consistency. Second, Finalize partially reorders external streams, which may be arbitrarily out-of-order, into well-behaved internal CEDR streams. More specifically, Finalize ensures that all output CTIs are output no earlier than the earliest correct time, and also ensures that all retractions in a retraction chain are issued in correct relative order.

The second operator to note is the Align operator. The Align operator blocks the events of the incoming stream and, combines inserts and retractions with other retractions when possible. The blocking time is controlled by a provided input function, although internal CTIs may cause early unblocking. The Align operator, therefore, controls the blocking axis of consistency.

The first type of query plan 500 is a stateless plan 502, and does not have either a Finalize or Align operator. These operators are unnecessary in the stateless plan 502, since there is no state to purge, and nothing is gained by blocking out-of-order events. In the stateless plan 502, since ExternalCTIs are never converted to CTIs, the ExternalCTIs are allowed to pass through the operators unchanged. This is generally the case with stateful operators, with the one exception, AlterLifetime.

The stateful plan 504 includes a Finalize followed by an Align below the first stateful operator Join. The Finalize and Align operators together determine the consistency of the query. Note that the stateful plans, at a minimum, have a Finalize operator below (somewhere) the first stateful operator, although an Align is optional. This ensures that all stateful operators operate over streams with no out-of-order CTIs and no out-of-order delete chains. As a result, no ExternalCTI algorithms are specified for stateful operators, with the exception of Finalize.

With respect to operator algorithms 400 of FIG. 4, operators in the CEDR system have a 1-to-1 correspondence with the operators described above. These operators implement the denotational semantics provided in all cases in order to be considered correct. Informal arguments are provided herein as to the correctness of the provided algorithms, as well as detailed examples for Join and Finalize showing the algorithm behavior on various input streams.

All operators, except Align and Finalize, are written assuming an output consistency level which involves no blocking and infinite memory (represented as B=0, M=∞). Algorithms for CTI events will, however, clean state that is sufficiently stale and which the CTI and operator semantics guarantee is no longer needed. Operators implemented in this manner can be made to behave according to any consistency level using the Align and Finalize operators.

All operators are written using copy out semantics. While this has no effect on asymptotic behavior, a real system may avoid this where possible. The disclosed algorithms can be adapted to avoid copying.

For each operator, the behavior is provided for processing insert, retraction, and CTI events, and for some operators, ExternalCTI events. A full system implementation addresses architectural issues such as push versus pull event processing and operator scheduling.

Throughout the algorithms 400, references are made to data structures which are ordered according to a specified key. These structures have the following methods:

1. Collection.Insert(K) inserts a key, in some cases a key value pair;
2. Collection.Remove(K) removes a key and possibly an accompanying value from the structure;
3. ResultCursor=Collection. Search(K) returns a cursor into the structure which initially points to the first exact key match. If there is no match, ResultCursor=Empty;
4. ResultCursor=Collection.SearchL(K) similar to Search, but returns a pointer to the first key less than K. Similarly, for SearchLE, SearchGE, and SearchG; and
5. ResultCursor=Collection.First( ) returns the first element of the collection according to the given sort order.

In addition, one or more operators make use of interval search structures based on a multidimensional structure. These structures have Insert, Remove, and Search functions comparable to the structures previously described for one-dimensional structures. When Search is given a point, it returns all intervals which contain the point. When Search is given an interval, it finds all overlapping intervals.

Inequality-based searches can be performed with an input point, and are used in situations where data intervals are non-overlapping, and therefore, ordered.

The Select operator is a filter that allows inserts and retractions to pass through the operator unchanged if the inserts and retractions satisfy a Boolean function f(Payload). Note that retractions need no special handling since the payload is included in the retraction. Therefore, if the payload in the retraction satisfies the function, the matching retraction chain has already passed through the Select. The resulting algorithms follow:

---
Algorithm for Selection $\sigma_f(S)$:
Insert/Retraction(e):
If f(e.Payload)
  Output a copy of e
CTI(e):
  Output a copy of e

---

AlterLifetime

The AlterLifetime operator uses two provided functions, $f_{Vs}(e)$ and $f_\Delta(e)$, to map incoming events from one valid time domain to another valid time domain. AlterLifetime employs constraints on the input functions:

$|f_{Vs}(e)|$ is constant or increasing with increasing $V_s$, and only depends on $V_s$ and constants (e.g., window size, chronon, etc.); and $|f_\Delta(e)|$ constant or decreasing with decreasing $V_e$.

The first constraint ensures that CTIs in the input imply CTIs on the output. The second constraint ensures that retractions in the input will never produce event lifetime expansions in the output.

AlterLifetime is similar to Select, but can be employed for a special case. Since full retractions and associated events are removed from the infinite canonical history tables upon which the semantics of AlterLifetime are defined, AlterLifetime ensures that full retractions in the input lead to full retractions in the output, in all cases. This is true even if, for example, $f_\Delta(e)$ is a constant, which is a common function and implements windows. The resulting algorithms for insert and retraction are shown below. Note that in this algorithm, $f_{new\Delta}(e)$ refers to a version of $f_\Delta(e)$ where all references to Ve are replaced with references to $V_{newe}$.

Algorithm for $\Pi_{f_{Vs}, f_\Delta}(S)$:

Operator State:
  LastCTI is a timestamp variable initialized to 0.

---
Insert(e):
Create an insert event ie
  ie.$V_s$ = $|f_{Vs}(e)|$
  ie.$V_e$ = $|f_{Vs}(e)|$ + $|f_\Delta(e)|$
  ie.Payload = e.Payload
output ie
Retraction(e):
Create a retraction event re
  re.$V_s$ = $|f_{Vs}(e)|$
  re.$V_e$ = $|f_{Vs}(e)|$ + $|f_\Delta(e)|$
  re.Payload = e.Payload
If e is a full retraction
  re. $V_{newe}$ = $|f_{Vs}(e)|$
Else
  re.$V_{newe}$ = $|f_{Vs}(e)|$ + $|f_{new\Delta}(e)|$
Output re

---

Describing the algorithm for CTI, $f_{Ve}(e)$ refers to a version of $f_{Vs}(e)$ where all references to $V_s$ are replaced with references to $V_e$. Note that when generating an output event, using $V_e=|f_{Ve}(e)|$, it can be the case where CTIs are generated which do not advance the clock. Assuming that CTIs arrive in increasing $V_s$ order, the problem can be avoided by delaying the output CTI until receiving a CTI which moves the output CTI forward in time. The resulting algorithm follows:

---
CTI(e):

If LastCTI != $|f_{Ve}(e)|$
  Create a CTI event ctie
  ctie.$V_e$=$|f_{Ve}(e)|$
  LastCTI = ctie.$V_e$
  output ctie

---

While there is no disclosed algorithm for external CTI, the given algorithms can be integrated into a combination of Finalize and AlterLifetime when it is desirable to combine windowing with forced expiration to improve state management.

Equijoins are joins where the Boolean function θ, when put in conjunctive normal form (CNF), has one or more conjuncts which are equality tests on columns from both input streams. For instance, consider the join plan:

$\bowtie$ S1.P = S2.P($S_1$, $S_2$)

Actual (or physical) input streams are shown in Table 4, which are used to illustrate how Join works. Note that the table includes both input streams, and uses a stream identifier (Sid) column to distinguish between events from the different streams. In addition, a CEDR (C) time column is included, even though not part of the physical event, to establish the order of arrival.

TABLE 4

Physical input streams for Join

| Sid | Type | $V_s$ | $V_e$ | $V_{newe}$ | C | P |
|---|---|---|---|---|---|---|
| $S_1$ | Insert | 0 | 2 | | 1 | $A_0$ |
| $S_1$ | Cti | | 1 | | 2 | |
| $S_1$ | Insert | 2 | 6 | | 3 | $A_1$ |
| $S_2$ | Insert | 3 | 5 | | 4 | $A_1$ |
| $S_2$ | Cti | | 3 | | 5 | |
| $S_1$ | Retract | 2 | 6 | 4 | 6 | $A_1$ |

Additionally, note that Table 5 shows the infinite canonical history table for the input streams, and Table 6 shows the result of applying the denotational semantics of Join to the infinite canonical history tables. For the Join algorithm to be correct, the infinite canonical history table of the output is identical to Table 6.

TABLE 5

Infinite Canonical History Table of Input

| Sid | $V_s$ | $V_e$ | (Payload) |
|---|---|---|---|
| $S_1$ | 0 | 1 | $A_0$ |
| $S_1$ | 2 | 4 | $A_1$ |
| $S_2$ | 3 | 5 | $A_1$ |

TABLE 6

Infinite Canonical History Table of Output

| $V_s$ | $V_e$ | (Payload) |
|---|---|---|
| 3 | 4 | A1 |

The disclosed algorithm for Join is based on a symmetric hash join. When an event arrives on one side, the other side is checked and output is produced. If the incoming event is an insert, join is to the other side and necessary inserts are outputted. If the incoming event is a retraction, join is to the other side to see whether any retractions of previously output events are necessary. Note that in addition to checking the equality predicate, for inserts, a check is also made as to whether Join candidates have lifetimes which overlap the lifetime of the incoming event. In the case of retractions, a check is also made as to whether the result of applying the retraction causes a previously output lifetime to shorten. Both of these checks involve retrieving all the entries from the hash bucket whose lifetimes overlap the input event. Therefore, a multidimensional structure is used to perform the overlaps test in an algorithmically efficient manner.

The resulting algorithms for insert and retraction are shown below. Note that since the algorithm is symmetric, only events on $S_1$ are considered.

Algorithm for Join $\bowtie_{\theta(P1,P2)}(S_1, S_2)$:
Operator State:
  Two Hashtables $SHash_1$ and $SHash_2$ which hash on the columnsets of the equijoin on $S_2$ and $S_1$, respectively. Each hash bucket contains a multidimensional structure keyed on the valid time interval of the event. Each hash supports three methods. Insert(e) and Remove(e) add and remove, respectively, events to the two level structure. FindMatchingInsert(e) takes a retraction event and returns the insert event in the two level structure which pairs with the retraction. $SHash_1$ and $SHash_2$ are initially empty.

$S_1CTI$ and $S_2CTI$ are timestamp variables which hold the latest $CTI V_e$ from $S_1$ and $S_2$ respectively and are initialized to zero.
  Ordered structures $EventV_eQ_1$ and $EventV_eQ_2$ with <key, value>=<$V_e$, event>. These are used for cleaning state when receiving CTI events.

```
Insert on S₁(e):
ResultCursor = SHash₂.Lookup(e).Search(e.Vₛ, e.Vₑ)
While ResultCursor != Empty
  If θ(e.Payload,ResultCursor.event.Payload)
    Create an insert event ie
    ie.Vₛ = max (e.Vₛ, ResultCursor.event.Vₛ)
    ie.Vₑ = min (e.Vₑ, ResultCursor.event.Vₑ)
    ie.Payload = (e.Payload, ResultCursor.event.Payload)
    output ie
  Increment ResultCursor
If e.Vₑ >= S₂CTI
  SHash₁.Insert(e)
  EventVₑQ₁.Insert(e.Vₑ, e)
    Retraction on S₁(e):
ResultCursor = SHash₂.Lookup(e).Search(e.Vₛ, e.Vₑ)
While ResultCursor != Empty
  If θ(e.Payload,ResultCursor.event.Payload)
    and
    e.V_newe<min(e.Vₑ, ResultCursor.event.Vₑ)
    Create a retraction event re
    re.Vₛ = max (e.Vₛ, ResultCursor.event.Vₛ)
    re.Vₑ = min (e.Vₑ, ResultCursor.event.Vₑ)
    re.V_newe = max(e.V_newe, ResultCursor.event.Vₛ)
    re.Payload = (e.Payload, ResultCursor.event.Payload)
    output re
  Increment ResultCursor
ie = SHash₁.FindMatchingInsert(e)
if ie != NULL
  SHash₁.Remove(ie)
  EventVₑQ₁.Remove(ie.Vₑ, ie)
  If e.V_newe >= S₂CTI
    ie.Vₑ = e.V_newe
    SHash₁.Insert(ie)
    EventVₑQ₁.Insert(ie.Vₑ, ie)
```

The algorithm for CTI events is provided. When the min of $S_1CTI$ and $S_2CTI$ increases, a CTI is output. In addition, events that can no longer contribute to future results are removed from the state. Since this algorithm is also symmetric, again, only events on $S_1$ are considered.

```
CTI on S₁(e):
If S₁CTI < S₂CTI
  Create a CTI event ctie
  ctie.Vₑ= min(e.Vₑ, S₂CTI)
  output ctie
S₁CTI = e.Vₑ
While EventVₑQ₂.NotEmpty &&
    EventVₑQ₂.First( ).Vₑ < e.Vₑ
  eventtoageout = EventVₑQ₂.First( )
  EventVₑQ₂.Remove(eventtoageout)
  SHash₂.Remove(eventtoageout)
```

Observe that this join algorithm, when provided with the input in Table 4, produces the output in Table 7. The infinite canonical history table of this output is, as used by the denotational semantics of join, the same as Table 6.

TABLE 7

Physical output of Join

| Type | $V_s$ | $V_e$ | $V_{newe}$ | P |
|---|---|---|---|---|
| Insert | 3 | 5 | | $A_1$ |
| CTI | | 1 | | |
| Retract | 3 | 5 | 4 | $A_1$ |

Sum

Sum, given an attribute A, sums the values of attribute A for all rows in each snapshot of the data. The result of this sum is updated in the infinite canonical history table for the output at every unique valid start and end point of events in the infinite canonical history table of the input.

This operator is implemented by keeping, for each unique event valid start and end time, the sum for the corresponding snapshot (the snapshot which includes the timestamp value) in an ordered structure OutputSums. In addition, each entry in the index contains a count, called NumEdges, of the number of event valid time start and end points with that timestamp value.

When an insert event arrives, the first entry in OutputSums whose key is less than or equal to the arriving event's $V_s$ is found. Starting with this entry, find all entries that correspond to output which needs to be retracted by retrieving subsequent entries in the index which are less than the arriving event's $V_e$. Through this process, the retractions are issued. Entries in OutputSums which are affected by the insertion are then updated, including possibly adding new entries in Output-Sums for the $V_s$ and Ve of the incoming event. Finally, the insertions are issued. In order to keep the number of retractions relatively small, and to produce perfect output when there are no retractions in the input and all events arrive in $V_s$ order, only snapshots which end at or before the latest seen $V_s$ are output. Therefore, a variable LatestV$_s$ is maintained which contains the latest seen $V_s$.

Retractions go through an almost identical process, except that when first searching OutputSums, find the entry preceding $V_{newe}$, rather than the entry preceding $V_s$. Additionally, rather than inserting or incrementing entries in the index for $V_s$ and $V_e$, the entry for $V_e$ is removed or decremented and, the entry for $V_{newe}$ is inserted or incremented. The resulting algorithms for insert and retract are shown below:

Algorithm for: Sum$_A$(S):
Operator State:
An ordered structure OutputSums with <key, value>=<$V_s$, (Sum, NumEdges)>. Note that each entry in the structure contains a Sum field, which is of the same type as A, and a NumEdges field, which is a positive integer. Initially, OutputSums has one entry with $V_s$=0, Sum=0, and NumEdges=0.
LatestV$_s$ is the latest V$_s$ timestamp value seen in any event. It is initially set to 0.

```
Insert (e):
// Issue Retractions
ResultCursor = OutputSums.SearchLE(e.V_s)
While (ResultCursor != Empty) and
        (ResultCursor.V_s < e.V_e) and
        (ResultCursor.V_s < LatestV_s)
    Create a retraction event re
    re.V_s = ResultCursor. V_s
    re.V_e = ResultCursor.Next( ).V_s
    re.V_newe = max (e.V_s, ResultCursor.V_s)
    re.Payload = ResultCursor.Sum
    output re
    Increment ResultCursor
    // Adjust OutputSums
ResultCursor = OutputSums.SearchGE(e.V_s)
While (ResultCursor != Empty) and
        (ResultCursor.V_s < e.V_e)
    ResultCursor.Sum += e.Payload.A
    Increment ResultCursor
ResultCursor = OutputSums.SearchLE(e.V_s)
If ResultCursor.V_s = e.V_s
    Increment ResultCursor.NumEdges
Else
    OutputSums.Insert(e.V_s, ResultCursor.Sum
                                + e.Payload.A, 1)
ResultCursor = OutputSums.SearchLE(e.V_e)
If ResultCursor.V_s = e.V_e
    Increment ResultCursor.NumEdges
Else
    OutputSums.Insert(e.V_e, ResultCursor.Sum −
                                e.Payload.A, 1)
    // Issue Inserts
InsertsStart = min (LatestV_s, e.V_s)
LatestV_s = max (LatestV_s, e.V_s)
ResultCursor=OutputSums.Search(InsertsStart)
While (ResultCursor.V_s < LatestV_s) and
        (ResultCursor.V_s <= e.V_e)
    If (ResultCursor.V_s != e.V_e) or
        (ResultCursor.NumEdges = 1)
        Create an insert event ie
        ie.V_s = ResultCursor.V_s
        ie.V_e = ResultCursor.Next( ).V_s
        ie.Payload = ResultCursor.Sum
        output ie
    Increment ResultCursor
        Retraction(e):
// Issue Retractions
ResultCursor = OutputSums.SearchLE(e.V_newe)
if (e is a full retraction) &&
    (ResultCursor.NumEdges == 1)
    Decrement ResultCursor
While (ResultCursor != Empty) and
        (ResultCursor.V_s <= e.V_e) and
        (ResultCursor.V_s < LatestV_s)
    If (ResultCursor.V_s != e.V_e) or
        (ResultCursor.NumEdges = 1)
        Create a retraction event re
        re.V_s = ResultCursor.V_s
        re.V_e = ResultCursor.Next( ).V_s
        if (ResultCursor.V_s < e.V_newe)
            (e is a full retraction) &&
            (ResultCursor.NumEdges == 1)
            re.V_newe = min (e.V_newe, ResultCursor.V_s)
        else
            re.V_newe = max (e.V_newe, ResultCursor.V_s)
        re.Payload = ResultCursor.Sum
        output re
    Increment ResultCursor
// Adjust OutputSums
ResultCursor = OutputSums.SearchGE(e.V_newe)
While (ResultCursor != Empty) and
        (ResultCursor.V_s < e.V_e)
    ResultCursor.Sum −= e.Payload.A
    Increment ResultCursor
ResultCursor = OutputSums.SearchLE(e.V_newe)
        If ResultCursor.V_s = e.V_newe
If e.V_s = e.V_newe
    If ResultCursor.NumEdges > 1
        Decrement ResultCursor.NumEdges
    Else
        OutputSums.Remove(e.V_s)
else
    Increment ResultCursor.NumEdges
Else
    OutputSums.Insert(e.V_newe, ResultCursor.Sum
                                − e.Payload.A, 1)
ResultCursor = OutputSums.Search(e.V_e)
If ResultCursor.NumEdges > 1
    Decrement ResultCursor.NumEdges
Else
    OutputSums.Remove(e.V_e)
```

```
// Issue Inserts
ResultCursor = OutputSums.SearchLE(e.V_newe)
While (ResultCursor.V_s < LatestV_s) and
      (ResultCursor.V_s < e.V_e)
   Create an insert event ie
   ie.V_s = ResultCursor.V_s
   ie.V_e = ResultCursor.Next( ).V_s
   ie.Payload = ResultCursor.Sum
   output ie
   Increment ResultCursor
```

The algorithm for CTI is the following. First, generate output from LatestV$_s$ to the incoming CTIs V$_e$. Then remove entries from OutputSums whose keys are older than the V$_e$ of the last output event. This can be done, since the CTI gives a guarantee that all events which can have an affect on output up to this point in time have been processed. Then, set LatestV$_s$ to the maximum of its current value and the V$_e$ of the last output event. Finally, propagate the CTI. The algorithm follows:

```
CTI(e):
// Issue inserts with V_e prior to CTI
ResultCursor = OutputSums.Search(LatestV_s)
While (ResultCursor != Empty) and
      (ResultCursor.Next( ) != Empty) and
      (ResultCursor.Next( ).V_s < e.V_e)
   Create an insert event ie
   ie.V_s = ResultCursor.V_s
   ie.V_e = ResultCursor.Next( ).V_s
   ie.Payload = ResultCursor.Sum
   output ie
   Increment ResultCursor
// Update OutputSums
ResultCursor = OutputSums.SearchLE(e.V_e)
OutputSums.RemoveL(ResultCursor.V_s)
// Update LatestV_s if necessary
LatestVs=max(LatestV_s,OutputSums.First( ).V_s)
// Propagate CTI
Output a copy of e
```

Align

While the align operator is a pass-through from a denotational semantics point of view (the input and output infinite canonical history tables are identical), Align is one of the components for realizing the spectrum of consistency levels described herein.

Specifically, Align is used to adjust the blocking component of consistency. This is accomplished by buffering and blocking incoming events for a certain period of time. It is not specified in the algorithm whether blocking is based on application time or system time, as either option is implementable and the distinction is semantically unimportant. While the events are buffered, retractions are combined with buffered earlier inserts or retractions of the same event. When events are unblocked through a CTI, events are released in sync timestamp order, and are accompanied by an output CTI.

Another way the operator may become unblocked is by using the outputtime( ) function, which returns the latest application timestamp of events which are to be unblocked. This function can internally refer to either system or application time. Outputtime( ) stays constant or increases with subsequent calls. When streams are unblocked in this manner, the V$_s$ time, rather than the sync time, is used, and no CTI is issued. This is due to the assumption that once an event is unblocked, all subsequent retractions for that event are unblocked.

Note that any stream may be converted to the highest consistency level from a blocking point of view by having outputtime( ) always return zero. All Align algorithms make use of a method, called Unblock. Unblock is the routine which actually releases blocked events in accordance with outputtime( ). The algorithms for insert and retraction are provided in below:

Algorithm for Align$_{outputtime( )}$(S):

Operator State:
- CurrentOutputTime keeps the last reading of outputtime( ), and represents the latest V$_s$ for which output events have been unblocked. CurrentOutputTime is initially set to zero
- LastCTI is the timestamp value of the last output CTI issued and is initialized to zero
- bufferedinserts is an ordered data structure which buffers events and uses the ordering key (V$_s$, V$_e$, P). This structure can be searched using a retraction event r. This search returns a match if the buffered entry b matches in the following way: b.V$_s$=r.V$_s$, b.V$_e$=r.V$_e$, b.Payload=r.Payload
- bufferedretractions is an ordered data structure which buffers events and uses the ordering key (V$_s$, V$_{newe}$, P, V$_e$). This structure may be searched using a retraction event r. This search returns a match if the buffered entry b matches in the following way: b.V$_s$=r.V$_s$, b.V$_{newe}$=r.V$_e$, b.Payload=r.Payload
- Ordered structure EventV$_e$Q$_{inserts}$ which contains insert events ordered by (V$_e$, V$_s$, P). This is used for unblocking inserts when receiving CTI events.
- Priority queue EventV$_{newe}$Q$_{retractions}$ which contains retraction events ordered by (V$_{newe}$, V$_e$, V$_s$, P). This is used for unblocking retractions when receiving CTI events.

```
Unblock( ):
CurrentOutputTime = outputtime( )
While ((bufferedinserts.First( ) != NULL) &&
       (bufferedinserts.First( ).V_s <=
        CurrentOutputTime)) or
      ((bufferedretractions.First( ) !=
        NULL) &&
       (bufferedretractions.First( ).V_s <=
        CurrentOutputTime))
   if ((bufferedretractions.First( ) ==
        NULL) ||
       ((bufferedinserts.First( ) != NULL) &&
        (bufferedinserts.First( ).V_s <=
         bufferedretractions.First( ).V_s)
      e_b = bufferedinserts.First( );
      Output a copy of e_b
      bufferedinserts.Remove(e_b)
      EventV_eQ_inserts.Remove(e_b)
   else
      e_b = bufferedretrations.First( );
      Output a copy of e_b
      bufferedretractions.Remove(e_b)
      EventV_neweQ_retractions.Remove(e_b)
Insert(e):
bufferedinserts.Insert(e)
EventV_eQ_inserts.Insert(e)
Unblock( )
           Retraction(e):
ResultCursor = bufferedinserts.Search(e)
If ResultCursor != Empty
   e_temp = ResultCursor.event( )
   bufferedinserts.Remove(e_temp)
   EventV_eQ_inserts.Remove(e_temp)
   e_temp.V_e = e.V_newe
   bufferedinserts.Insert(e_temp)
   EventV_eQ_inserts.Insert(e_temp)
```

```
        else
            ResultCursor=bufferedretractions.Search(e)
            If ResultCursor != Empty
                e_temp = ResultCursor.event( )
                bufferedretractions.Remove(e_temp)
                EventV_newe Q_retractions.Remove(e_temp)
                e_temp.V_newe = e.V_newe
                bufferedretractions.Insert(e_temp)
                EventV_newe Q_retractions.Insert(e_temp)
            else
                bufferedretractions.Insert(e)
                EventV_newe Q_retractions.Insert(e)
Unblock( )
```

Align may also be unblocked when it receives a CTI. This is permissible, even if outputtimer( ) has not reached the incoming CTIs $V_e$ since there is a guarantee that no more events can arrive which may be combined with some buffered events. The algorithm can be found below:

```
CTI(e):

While ((EventV_e Q_inserts.First( ) != NULL) &&
       (EventV_e Q_inserts.First( ).V_e <= e.V_e)) or
       ((EventV_newe Q_retractions.First( ) != NULL) &&
       (EventV_newe Q_retractions.First( ).V_newe <= e.V_e))
    if ((EventV_newe Q_retractions.First( ) == NULL) ||
        ((EventV_e Q_inserts.First( ) != NULL) &&
        (EventV_e Q_inserts.First( ).V_e <=
            EventV_newe Q_retractions.First( ).V_newe)
        e_b = EventV_e Q_inserts.First( )
        Output copy of e_b
        bufferedinserts.Remove(e_b)
        EventV_e Q_inserts.Remove(e_b)
    else
        e_b = EventV_newe Q_retractions.First( )
        Output copy of e_b
        bufferedretractions.Remove(e_b)
        EventV_newe Q_retractions.Remove(e_b)
Unblock( )
If bufferedinserts.First( ) != NULL
    NewCTI=min(e.V_s,bufferedinserts.First( ).V_s)
Else
    NewCTI=e.V_s
If (NewCTI > LastCTI)
    Output a CTI with V_s = NewCTI
    LastCTI = NewCTI
```

Finalize

The Finalize operator serves two related purposes in the system. The first purpose is to enable queries with Finalize operators to navigate in the consistency space along the memory axis. This is accomplished by having Finalize issue CTIs for time periods which can be called "final". These CTIs are induced by a function finalizetime( ), which is similar to the outputtime( ) function used in Align. Unlike Align, Finalize does impact the infinite canonical history table of the output, as any operator that limits memory does. Finalize, therefore, is used with a high degree of care and understanding.

The second purpose of Finalize is, like Align, semantically transparent. Finalize buffers all incoming events, with the purpose of correctly ordering out-of-order retraction chains, and also placing output CTIs at no earlier than the earliest correct opportunity. Finalize receives ExternalCTIs instead of CTIs. While Finalize never blocks well formed output, Finalize does remember most events until either an external CTI guarantees Finalize can no longer connect to an incoming retraction, or the finalizetime( ) function enables the events to be forgotten.

These events are stored in a structure called receivedevents, which is sorted on the events' sync time. These algorithms are broken into a number of pieces. In addition to the insert, retraction, and CTI functions, a function CleanState is provided which removes all events from supporting memory structures with sync time less than the time passed into the function. Additionally, a function AgeOut is provided which forces CTIs and event cleanup based on the time returned by finalizetime( ). Finally, ReceiveEventforCTI adds events to receivedevents and also checks to see whether a CTI can be correctly issued. The algorithms for insert, retraction, and CTI can be found below:

Algorithm for Finalize$_{finalizetime( )}$(S):

Operator state:
LastCTI is the timestamp value of the last output CTI issued. It is initialized to zero CTILifetimes is an ordered data structure which stores non-overlapping valid time intervals $[V_s, V_e)$ in order. Associated with each entry are expected and received fields, which store the number of events expected and received with a sync time which falls within the associated time interval. When insert is called, the parameters provide initial values in the following order ($V_s$, $V_e$, expected, received)

Receivedevents is an ordered data structure with entries <key, value>=$V_{sync}$, Event> brokenretractionssucc is an ordered data structure which stores entries <Key, value>=<($V_s$, $V_e$, Payload), Event>. When it is searched using a retraction r, it finds all entries $e_b$ with $e_b.V_s$=r.$V_s$, $e_b.V_e$=r.$V_{newe}$, $e_b$.Payload=r.Payload Brokenretractionsprev is an ordered data structure which stores entries <Key, Value>=<($V_{newe}$, $V_s$, Payload), Event>. When it is searched using a retraction r, it finds all entries $e_b$ with $e_b.V_s$=r.$V_s$, $e_b.V_{newe}$=r.$V_e$, $e_b$.Payload=r.Payload bufferedinsertsby$V_s$ is an ordered data structure which stores entries <Key>=<$V_e$, $V_s$, Payload>. The entries correspond to a set of inserts and may be searched with either an insert or retraction. In either case, exact field matches will be searched for, and in the case of retractions, $V_{newe}$ is ignored.

```
            UpdateCTI(NewCTI)
    If LastCTI < NewCTI
        Create CTI event ctie
        ctie.V_e = NewCTI
        CleanState(ctie.V_e)
        output ctie
        LastCTI = ctie.V_e
            ReceiveEventforCTI(V_sync, e)
    receivedevents.Insert(V_sync, e)
    ResultCursor = CTILifetimes.Search(V_sync)
    If ResultCursor != Empty
        Increment ResultCursor.received
        If ResultCursor.received=
            ResultCursor.expected and
            ResultCursor.Entry( ) =
            CTILifetimes.First( )
            UpdateCTI(ResultCursor.V_e)
                CleanState(V_stale)
    For each event e in receivedevents with V_sync < V_stale:
        remove entry from receivedevents
    For each
        If e is a retraction
            brokenretractionssucc.Remove(e)
            brokenretractionsprev.Remove(e)
        Else
            bufferedinsertsbyV_s.Remove(e)
```

-continued

```
While CTILifetimes.First( ).V_e <= V_stale
    CTILifetimes.Remove(CTILifetimes.First( ))
        AgeOut(V_stale)
ResultCursor = CTILifetimes.Search(V_stale)
If ResultCursor != Empty
    NewCTI = ResultCursor.V_s
Else
    NewCTI = V_stale
UpdateCTI(NewCTI)
        Insert(e):
If e.V_s >= LastCTI
    e_temp.V_s = e.V_s
    e_temp.V_newe = e.V_e
    e_temp.Payload = e.Payload
    ResultCursor =
            brokenretractionssucc.Search(e_temp)
    if ResultCursor != Empty
        e.V_e = ResultCursor.V_newe
        e_remove = ResultCursor.Event( )
        brokenretractionssucc.Remove(e_remove)
        brokenretractionsprev.Remove(e_remove)
    Output a copy of e
    bufferedinsertsbyV_s.Insert(e)
    ReceiveEventforCTI(e.V_s, e)
    AgeOut(finalizetime( ))
        Retraction(e):
If e.V_newe >= LastCTI
    ResultCursor=
            brokenretractionsprev.Search(e)
    if ResultCursor != Empty
        e.V_e = ResultCursor.V_e
        e_remove = ResultCursor.Event( )
        brokenretractionssucc.Remove(e_remove)
        brokenretractionsprev.Remove(e_remove)
    ResultCursor =
            Brokenretractionssucc.Search(e)
    if ResultCursor != Empty
        e.V_newe = ResultCursor.V_newe
        e_remove = ResultCursor.Event( )
        brokenretractionssucc.Remove(e_remove)
        brokenretractionsprev.Remove(e_remove)
    bufferedinsertsbyV_s.Search(e)
    if ResultCursor = Empty
        brokenretractionsprev.Insert(e)
        brokenretractionssucc.Insert(e)
    else
        ResultCursor.V_e = e.V_newe
        output a copy of e
    ReceiveEventforCTI(e.V_newe, e)
    AgeOut(finalizetime( ))
        ExternalCTI(e)
CTILifetimes.Insert(e.V_s, e.V_e, e.Count, 0)
ResultCursor = CTILifetimes.Search(e.V_s)
For each element e_r of receivedevents with
    e.V_s <= V_sync < e.V_e
    Increment ResultCursor.received
    If ResultCursor.received =
            ResultCursor.expected and
    ResultCursor.entry( ) =
        CTILifetimes.First( )
            UpdateCTI(ResultCursor.V_e)
    AgeOut(finalizetime( ))
```

To better understand the subtle behavior of the Finalize operator, an example is provided to illustrate how broken retraction chains are repaired, and how internal CTIs are generated from external CTIs. The physical stream corresponding to this example is shown in Table 8. Note that a CEDR time column (C) is included to show the order of arrival, though it is not part of the physical event. In addition, the Count field for ExternalCTIs is shown in the payload column. When referring to event 1, this refers to the event which arrived at CEDR time 1. When referring to event 2, this refers to the event which arrived at CEDR time 2, etc.

TABLE 8

Physical Input Stream for Finalize

| Type | $V_s$ | $V_e$ | $V_{newe}$ | C | P |
|------|-------|-------|------------|---|---|
| Retract | 0 | 10 | 8 | 1 | $P_0$ |
| Retract | 0 | 6 | 4 | 2 | $P_0$ |
| Retract | 0 | 8 | 6 | 3 | $P_0$ |
| Insert | 0 | 10 |  | 4 | $P_0$ |
| ExternalCTI | 0 | 8 |  | 5 | 5 |
| Insert | 1 | 5 |  | 6 | $P_1$ |

It is assumed that the finalizetime( ) function associated with this finalize operator always returns zero. In this case, Finalize will not change the semantics (eventual state) of its input stream. Now it will be shown that the algorithm for Finalize produces the correct result.

When event 1 arrives, it is inserted into brokenretractions as well as receivedevents.

When event 2 arrives, it is also inserted into brokenretractions and receivedevents.

When event 3 arrives, it is combined with the broken retractions from events 1 and 2 and itself stored in brokenretractions with $V_s=0$, $V_{newe}=4$, $V_e=10$. Events 1 and 2 are removed from brokenretractions. The original event 3 is also inserted into receivedevents.

When event 4 arrives, it is combined with the event in brokenretractions, and its. $V_e$ is changed to 4. The event in brokenretractions is then removed. Also, the modified event 4 is output and inserted into bufferedinsertsbyV_s as well as receivedevents.

When externalCTI arrives at CEDR time 5, an entry, denoted as N, with value (0, 8, 5, 0) is inserted into CTILifetimes. Next, since there are 4 events stored in receivedevents with sync value between 0 and 8, N.received is set to 4.

When event 6 arrives, it is first output, and then stored in both bufferedinsertsbyV_s and receivedevents. Next, since event 6 falls into entry N in CTILifetimes. N.received is incremented, and is now equal to N.expected=5. As a result, an internal CTI event is output with $V_e=8$. LastCTI is updated to 8, and in cleaning the operator state, all 5 events stored in receivedevents, the two events stored in bufferedinsertsbyV_s, and N in CTILifetimes are removed.

Following is a series of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 6:
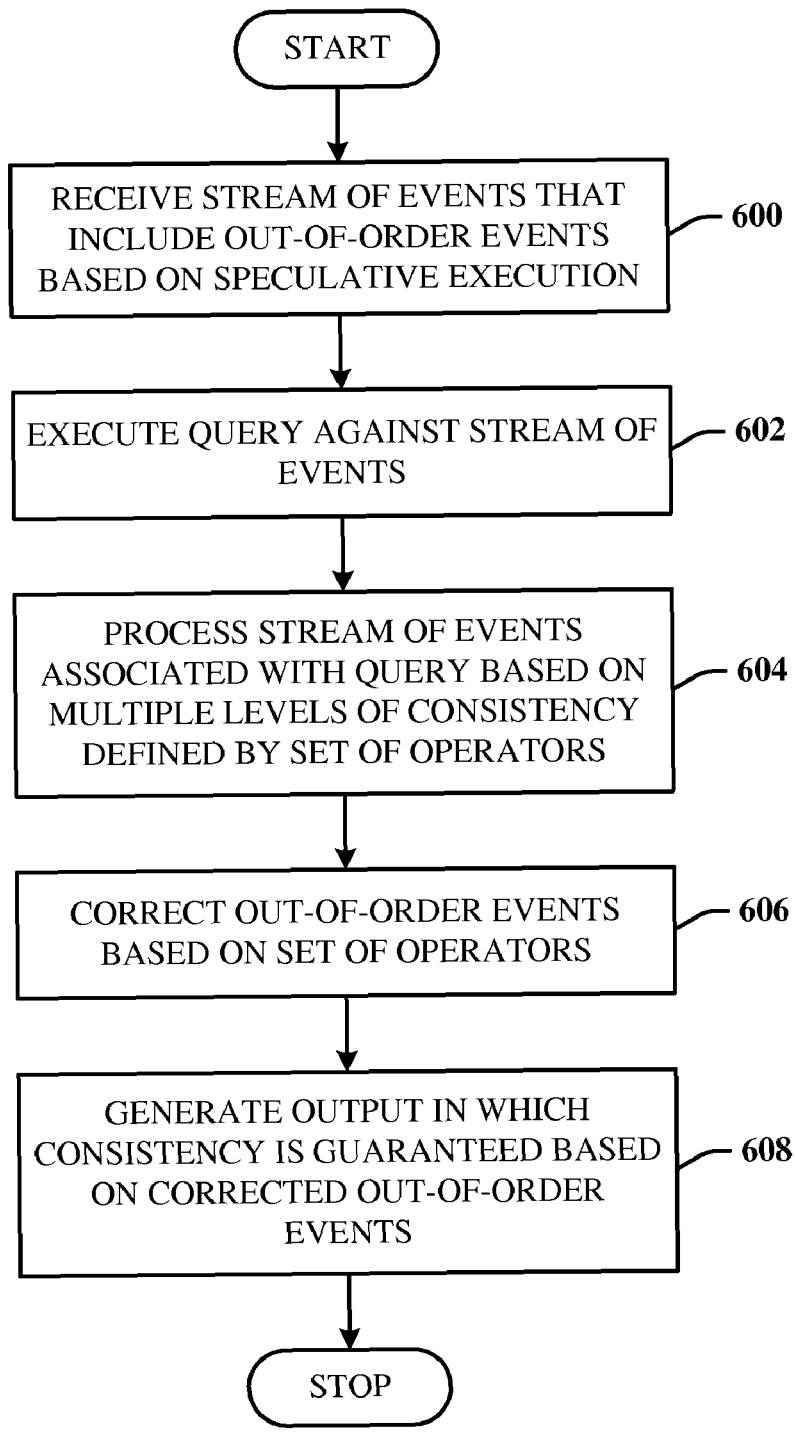
FIG. 6 illustrates a method of processing a stream of events.

FIG. 6 illustrates a method of processing a stream of events. At 600, a stream of events is received that includes out-of-order events based on speculative execution. At 602, a query is executed against the stream of events. At 604, the stream of events associated with the query is processed based on multiple levels of consistency defined by a set of operators. At 606, the out-of-order events are corrected based on the set of operators. At 608, an output is generated in which consistency is guaranteed based on the corrected out-of-order events.

Figure 7:
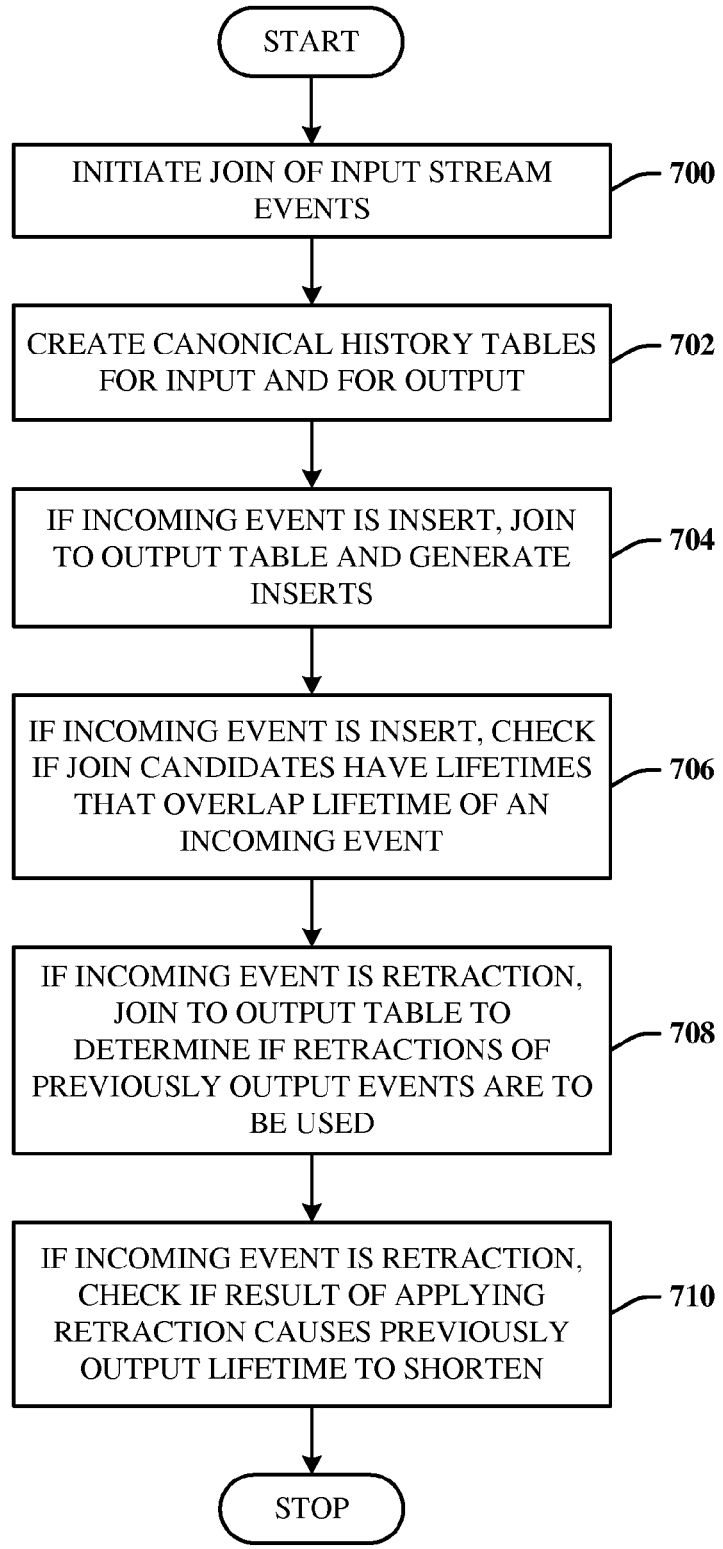
FIG. 7 illustrates a method of employing a Join algorithm for processing inserts, retractions and CTIs.

FIG. 7 illustrates a method of employing a Join algorithm for processing inserts, retractions and CTIs. At 700, a Join function is implemented for joining input stream events. At 702, canonical history tables are created for input and output. At 704, if an incoming event is an insert, the input table is joined to the output table and inserts are generated. At 706, if an incoming event is an insert, a check is made if the join candidate events have lifetimes that overlap a lifetime of an incoming event. At 708, if an incoming event is a retraction, the input table is joined to the output table to determine if retractions of previously output events are to be used. At 710, if an incoming event is a retraction, a check is made to determine if a result of applying the retraction causes a previously output lifetime to shorten.

Figure 8:
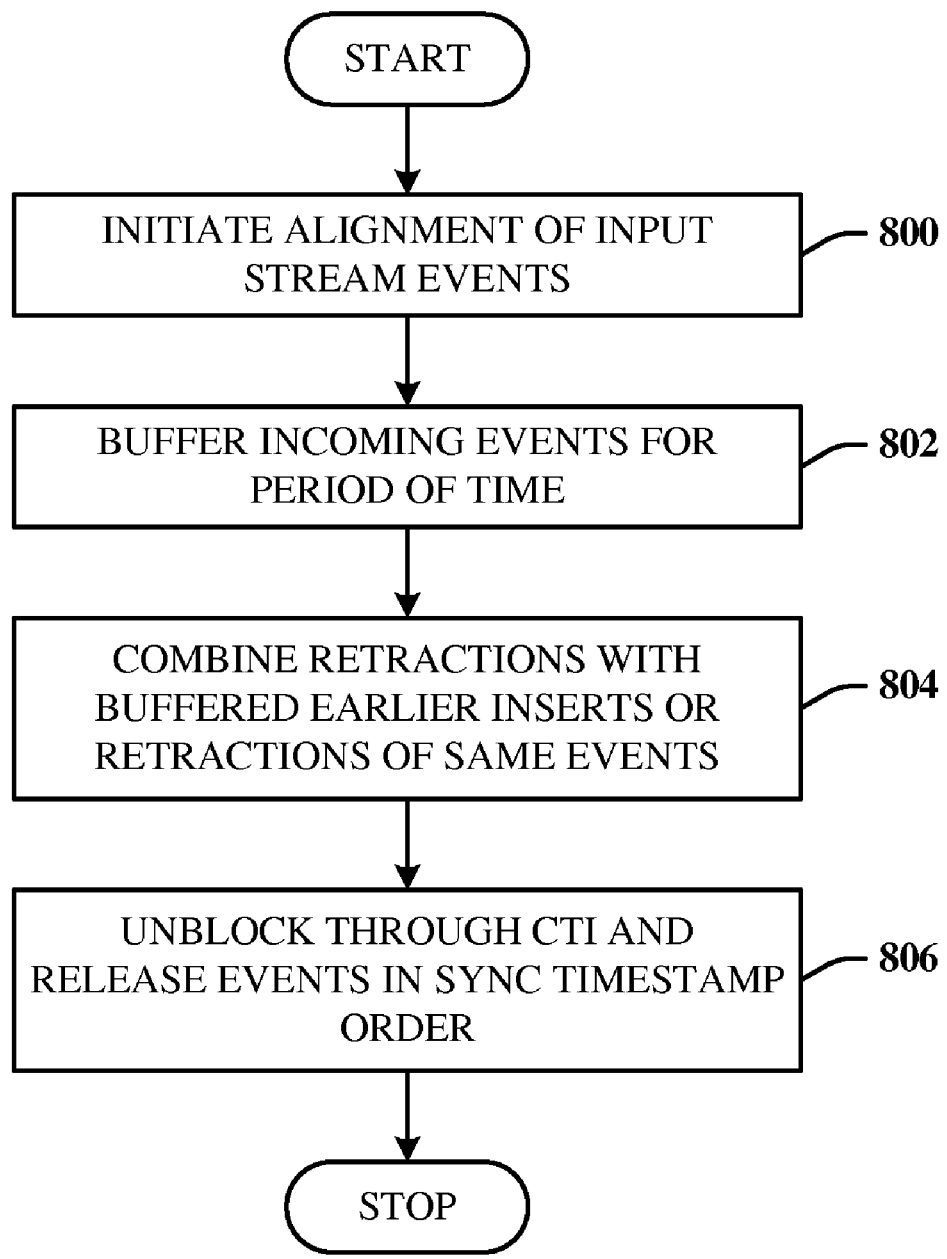
FIG. 8 illustrates a method of aligning input stream events.

FIG. 8 illustrates a method of aligning input stream events. At 800, alignment of input streams is initiated. At 802, incoming events are buffered for a predetermined period of time. At 804, retractions are combined with the buffered earlier inserts or retractions of the same events. At 806, events are unblocked through a CTI and, the events are released in sync timestamp order and accompanied by an output CTI.

Figure 9:
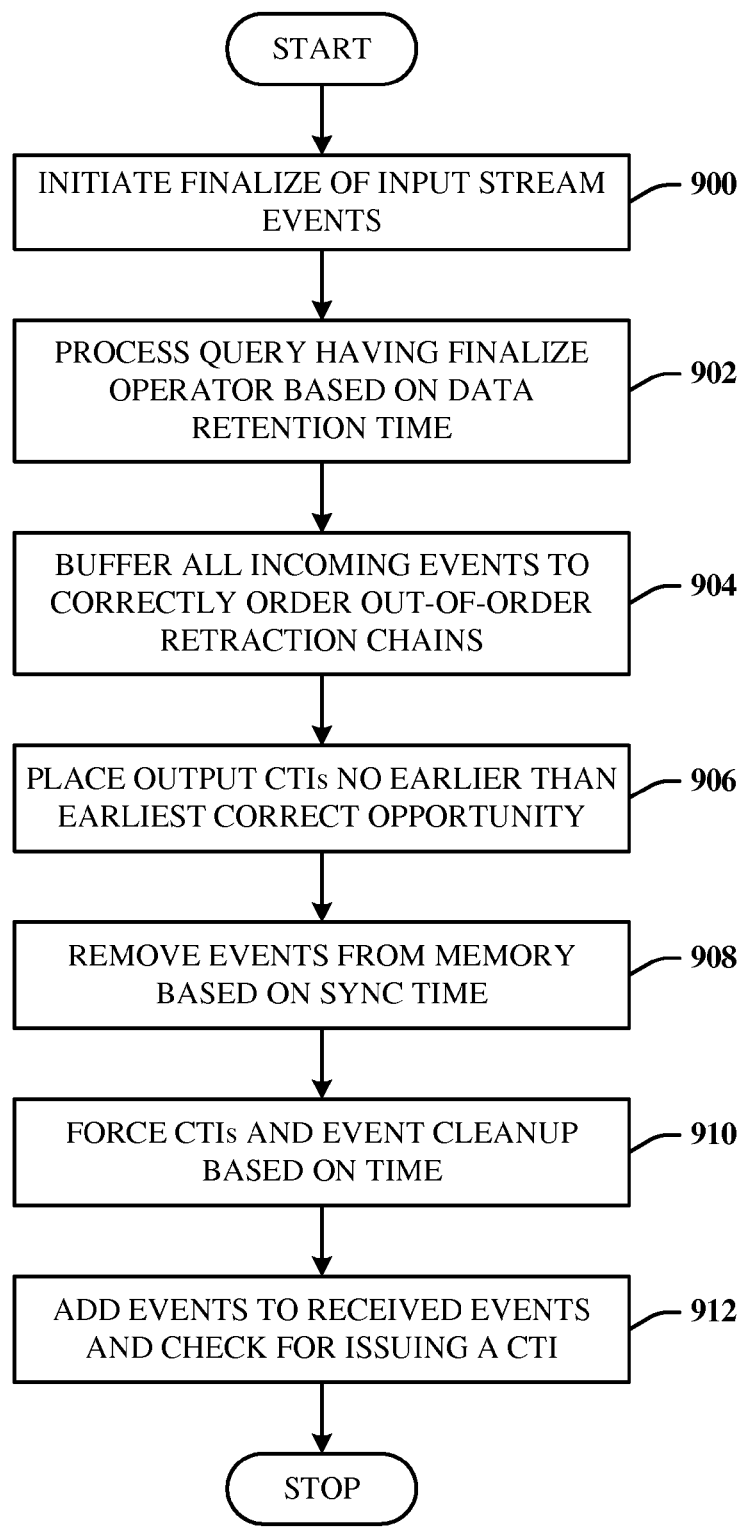
FIG. 9 illustrates a method of finalizing query processes.

FIG. 9 illustrates a method of finalizing query processes. At 900, finalization of input stream events is initiated. At 902, a query is processed having a finalize operator based on data retention time. At 904, all incoming events are buffered to correct out-of-order retraction chains. At 906, output CTIs are placed no earlier than the earliest correct opportunity. At 908, events are removed from memory based on the sync time. At 910, CTIs can be forced and event cleanup performed based on time passed into a finalizetime function. At 912, events can be added to received events and also checks to determine if a CTI can be correctly issued.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Figure 10:
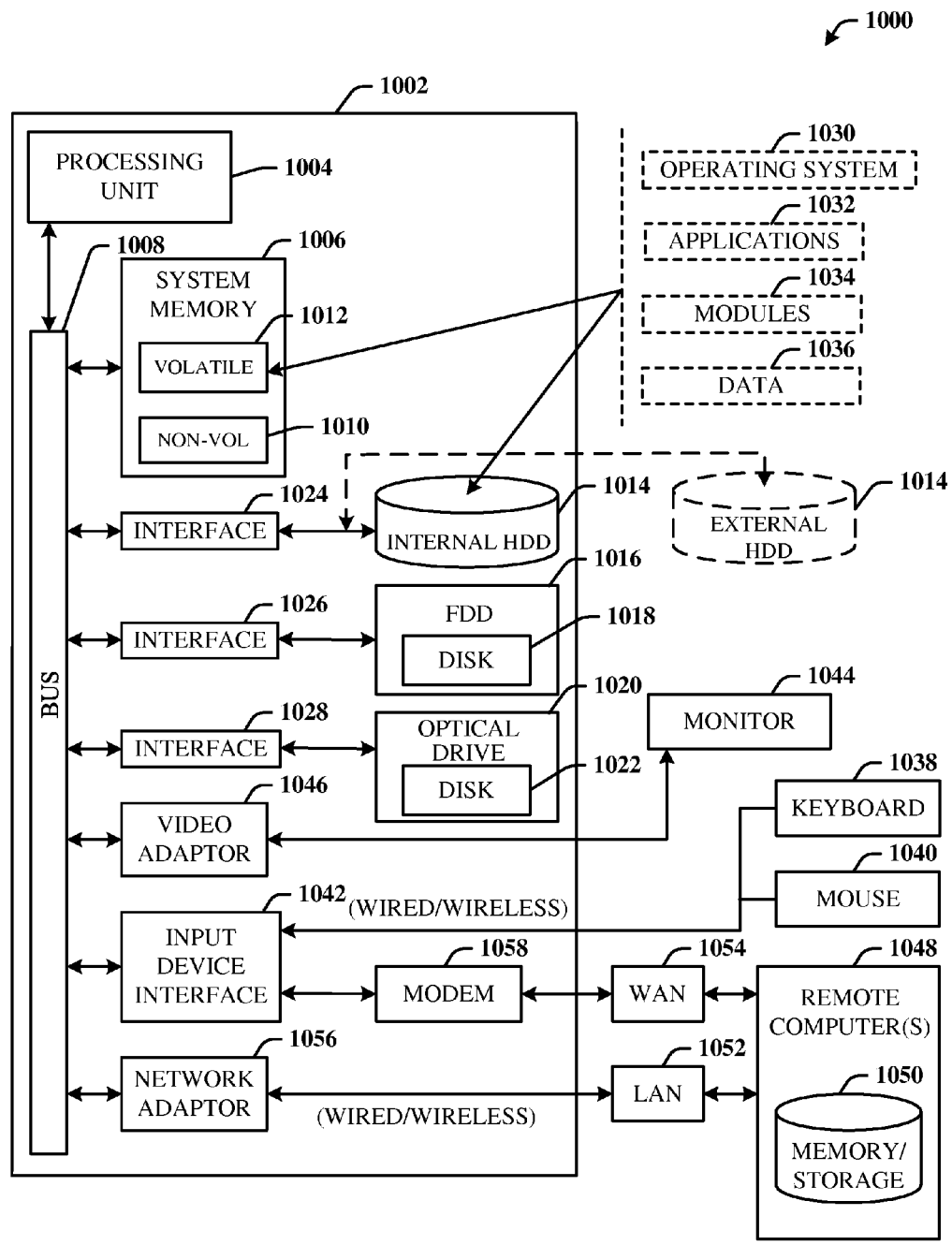
FIG. 10 illustrates a block diagram of a computing system operable to execute consistency sensitive streaming operators in accordance with the disclosed architecture.

Referring now to FIG. 10, there is illustrated a block diagram of a computing system 1000 operable to execute consistency sensitive streaming operators in accordance with the disclosed architecture. In order to provide additional context for various aspects thereof, FIG. 10 and the following discussion are intended to provide a brief, general description of a suitable computing system 1000 in which the various aspects can be implemented. While the description above is in the general context of computer-executable instructions that may run on one or more computers, those skilled in the art will recognize that a novel embodiment also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes volatile and non-volatile media, removable and non-removable media. By way of example, and not limitation, computer-readable media can comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 10, the exemplary computing system 1000 for implementing various aspects includes a computer 1002 having a processing unit 1004, a system memory 1006 and a system bus 1008. The system bus 1008 provides an interface for system components including, but not limited to, the system memory 1006 to the processing unit 1004. The processing unit 1004 can be any of various commercially available processors. Dual microprocessors and other multi-processor architectures may also be employed as the processing unit 1004.

The system bus 1008 can be any of several types of bus structure that may further interconnect to a memory bus (with or without a memory controller), a peripheral bus, and a local bus using any of a variety of commercially available bus architectures. The system memory 1006 can include non-volatile memory (NON-VOL) 1010 and/or volatile memory 1012 (e.g., random access memory (RAM)). A basic input/output system (BIOS) can be stored in the non-volatile memory 1010 (e.g., ROM, EPROM, EEPROM, etc.), which BIOS stores the basic routines that help to transfer information between elements within the computer 1002, such as during start-up. The volatile memory 1012 can also include a high-speed RAM such as static RAM for caching data.

The computer 1002 further includes an internal hard disk drive (HDD) 1014 (e.g., EIDE, SATA), which internal HDD 1014 may also be configured for external use in a suitable chassis, a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as a DVD). The HDD 1014, FDD 1016 and optical disk drive 1020 can be connected to the system bus 1008 by a HDD interface 1024, an FDD interface 1026 and an optical drive interface 1028, respectively. The HDD interface 1024 for external drive implementations can include at least one or both of Universal Serial Bus (USB) and IEEE 1394 interface technologies.

The drives and associated computer-readable media provide nonvolatile storage of data, data structures, computer-executable instructions, and so forth. For the computer 1002, the drives and media accommodate the storage of any data in a suitable digital format. Although the description of computer-readable media above refers to a HDD, a removable magnetic diskette (e.g., FDD), and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing novel methods of the disclosed architecture.

A number of program modules can be stored in the drives and volatile memory 1012, including an operating system 1030, one or more application programs 1032, other program modules 1034, and program data 1036. The one or more application programs 1032, other program modules 1034, and program data 1036 can include the stream component 102, operators 104, consistency levels 106, consistency monitor 302, operational module 304, alignment buffer 306, operator state 308, and Select, Join, Sum, Align, Finalize, and AlterLifetime operators, for example.

All or portions of the operating system, applications, modules, and/or data can also be cached in the volatile memory 1012. It is to be appreciated that the disclosed architecture can be implemented with various commercially available operating systems or combinations of operating systems.

A user can enter commands and information into the computer 1002 through one or more wire/wireless input devices, for example, a keyboard 1038 and a pointing device, such as a mouse 1040. Other input devices (not shown) may include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces such as a parallel port, IEEE 1394 serial port, a game port, a USB port, an IR interface, etc.

A monitor 1044 or other type of display device is also connected to the system bus 1008 via an interface, such as a video adaptor 1046. In addition to the monitor 1044, a computer typically includes other peripheral output devices (not shown), such as speakers, printers, etc.

The computer 1002 may operate in a networked environment using logical connections via wire and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wire/wireless connectivity to a local area network (LAN) 1052 and/or larger networks, for example, a wide area network (WAN) 1054. Such LAN and WAN networking environments are commonplace in offices and companies, and facilitate enterprise-wide computer networks, such as intranets, all of which may connect to a global communications network, for example, the Internet.

When used in a LAN networking environment, the computer 1002 is connected to the LAN 1052 through a wire and/or wireless communication network interface or adaptor 1056. The adaptor 1056 can facilitate wire and/or wireless communications to the LAN 1052, which may also include a wireless access point disposed thereon for communicating with the wireless functionality of the adaptor 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wire and/or wireless device, is connected to the system bus 1008 via the input device interface 1042. In a networked environment, program modules depicted relative to the computer 1002, or portions thereof, can be stored in the remote memory/storage device 1050. It will be appreciated that the network connections shown are exemplary and other means of establishing a communications link between the computers can be used.

The computer 1002 is operable to communicate with any wireless devices or entities operatively disposed in wireless communication, for example, a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi (or Wireless Fidelity) and Bluetooth™ wireless technologies. Thus, the communication can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3 or Ethernet).

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented system for stream processing, comprising:
    a stream component for receiving an input stream that includes event imperfections based on speculative execution and for providing consistency in an output, wherein the speculative execution comprises refraction of incorrect events by using a set of operators for removing speculatively produced incorrect output, the output produced by the speculative execution of a streaming operator is non-blocking;
    the set of operators for providing multiple consistency levels by varying blocking time and data retention time in memory, wherein blocking time exposes a tradeoff between a degree of speculation and latency and data retention time in memory exposes a tradeoff between state size and correctness, via which consistency in the output is guaranteed, and the consistency is varied on a per query basis via the set of operators; and
    a microprocessor that executes computer-executable instructions associated with at least one of the stream component or the set of operators.

2. The system of claim 1, wherein the set of operators includes an operator that passes inserts and retractions unchanged according to a Boolean function.

3. The system of claim 1, wherein the set of operators includes an operator that maps incoming events from one valid time domain to another valid time domain.

4. The system of claim 1, wherein the set of operators includes an operator that tests equality of table columns of multiple input streams.

5. The system of claim 1, wherein the set of operators includes an operator that checks for join candidates which have lifetimes that overlap a lifetime of an incoming event.

6. The system of claim 1, wherein the set of operators includes an operator that checks if an applied retraction causes a previously output lifetime to shorten.

7. The system of claim 1, wherein the set of operators includes an operator that ensures a full retraction in the input stream leads to a full retraction in the output.

8. The system of claim 1, wherein the multiple consistency levels are characterized by a maximum blocking time and a maximum data retention time using the set of operators.

9. The system of claim 1, wherein one or more of the set of operators are view update compliant.

10. The system of claim 1, wherein the set of operators includes an operator that receives an insert event, a retraction event, and a current time increment event.

11. A computer-implemented method of processing a stream of events, comprising acts of:
receiving a stream of events that includes out-of-order events based on speculative execution that comprises retraction of incorrect events by using a set of operators for removing speculatively produced incorrect output, the output produced by the speculative execution of a streaming operator is non-blocking;
executing a query against the stream of events;
processing the stream of events associated with the query based on multiple levels of consistency defined by the set of operators;
varying the consistency on a per query basis using the set of operators, the consistency varied by acts that include;
selecting a level of consistency by varying a blocking time that exposes a tradeoff between a degree of speculation and latency;
selecting a level of consistency by varying a data retention time in memory that exposes a tradeoff between state size and correctness;
correcting the out-of-order events based on the set of operators;
generating an output in which consistency is guaranteed based on the corrected out-of-order events; and
utilizing a microprocessor that executes instructions stored in memory to perform at least one of the acts of receiving, executing, processing, varying, selecting, correcting, or generating.

12. The method of claim 11, further comprising correcting the out-of-order events based on an operator that passes an insert event and a retraction event unchanged subject to a function that considers event payload.

13. The method of claim 11, further comprising correcting the out-of-order events based on an operator the output of which describes changing state of a view which joins two input relations.

14. The method of claim 11, further comprising correcting the out-of-order events based on an operator that sums values of an attribute for all table rows for a snapshot of the stream of events.

15. The method of claim 11, further comprising correcting the out-of-order events based on an operator that reduces a query which crosses snapshot boundaries to a query that is view update compliant.

16. The method of claim 11, further comprising correcting the out-of-order events based on an operator that blocks the events of the stream of events and combines insets and retractions with other retractions.

17. The method of claim 11, further comprising correcting the out-of-order events based on an operator that ensures that output current time increment events are no earlier than an earliest correct time and that retractions in a retraction chain are issued in correct relative order.

18. A computer-implemented system, comprising:
at least one computer including a microprocessor that executes computer-executable instructions, configured to:
receive a stream of events that includes out-of-order events based on speculative execution that comprises retraction of incorrect events by using a set of operators for removing speculatively produced incorrect output, the output produced by the speculative execution of a streaming operator is non-blocking;
execute a query against the stream of events;
process the stream of events associated with the query based on multiple levels of consistency defined by the set of operators;
vary the consistency on a per query basis using the set of operators;
select a level of consistency by varying blocking time that exposes a tradeoff between a degree of speculation and latency;
select a level of consistency by varying data retention time in memory that exposes a tradeoff between state size and correctness;
correct the out-of-order events based on the set of operators; and
generate an output in which consistency is guaranteed based on the corrected out-of-order events.

* * * * *